United States Patent
Takebayashi et al.

(10) Patent No.: US 10,233,343 B2
(45) Date of Patent: Mar. 19, 2019

(54) AQUEOUS INK, INK CARTRIDGE, AND INK JET RECORDING METHOD

(71) Applicant: CANON KABUSHIKI KAISHA, Tokyo (JP)

(72) Inventors: Satoshi Takebayashi, Tokyo (JP); Shuichi Okazaki, Fujisawa (JP); Minako Kawabe, Koganei (JP); Yuko Nishiwaki, Mitaka (JP); Hiroshi Kakikawa, Fujisawa (JP); Eriko Kawakita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 15/227,291

(22) Filed: Aug. 3, 2016

(65) Prior Publication Data

US 2017/0037267 A1 Feb. 9, 2017

(30) Foreign Application Priority Data

Aug. 7, 2015 (JP) .................................. 2015-156883

(51) Int. Cl.
   *B41J 2/01* (2006.01)
   *C09D 11/322* (2014.01)
   *C09D 11/102* (2014.01)

(52) U.S. Cl.
   CPC .............. *C09D 11/322* (2013.01); *B41J 2/01* (2013.01); *C09D 11/102* (2013.01)

(58) Field of Classification Search
   None
   See application file for complete search history.

(56) References Cited

U.S. PATENT DOCUMENTS

| H0304 H | * | 7/1987 | Vorrier ............................ 522/92 |
| 5,679,138 A | * | 10/1997 | Bishop ................. C09D 11/322 |
| | | | 106/31.65 |
| 6,966,944 B2 | | 11/2005 | Shimomura et al. |
| 7,176,248 B2 | | 2/2007 | Valentini et al. |
| 7,208,033 B2 | | 4/2007 | Kawabe et al. |

(Continued)

FOREIGN PATENT DOCUMENTS

| JP | 2001-187851 A | 7/2001 |
| JP | 2005-515289 A | 5/2005 |

(Continued)

*Primary Examiner* — Erica Lin
(74) *Attorney, Agent, or Firm* — Venable LLP

(57) ABSTRACT

An aqueous ink for use in an ink jet recording method in which ink is thermally ejected from a recording head to record an image on a recording medium. The aqueous ink includes zirconium oxide; a pigment; a resin dispersant for the pigment; and a first and a second urethane resin. The content (ppm) of the zirconium oxide in terms of zirconium is 0.5-20.0 ppm based on the total mass of the ink. The pigment is at least one of phthalocyanine, quinacridone, diketopyrrolopyrrole, dioxazine, perinone, perylene and anthraquinone pigments. Each of the first and second urethane resins has a unit derived from a polyether polyol. The ratio of the weight-average molecular weight $Mw_1$ of the first urethane resin to the weight-average molecular weight $Mw_2$ of the second urethane resin is 0.20-0.80 times. The second urethane resin has a weight-average molecular weight $Mw_2$ of 20,000-70,000.

15 Claims, 3 Drawing Sheets

(56) References Cited

U.S. PATENT DOCUMENTS

| | | |
|---|---|---|
| 7,244,299 B2 | 7/2007 | Tsuji et al. |
| 7,297,194 B2 | 11/2007 | Shinjo et al. |
| 7,364,770 B2 | 4/2008 | Nagashima et al. |
| 7,445,666 B2 | 11/2008 | Yanagimachi et al. |
| 7,618,484 B2 | 11/2009 | Fujimoto et al. |
| 7,629,395 B2 | 12/2009 | Nishiguchi et al. |
| 7,637,603 B2 | 12/2009 | Kawabe et al. |
| 7,705,071 B2 | 4/2010 | Nakagawa et al. |
| 7,723,403 B2 | 5/2010 | Nishiwaki et al. |
| 7,863,351 B2 | 1/2011 | Nishiwaki et al. |
| 7,973,097 B2 | 7/2011 | Nishiguchi et al. |
| 8,025,722 B2 | 9/2011 | Kawabe et al. |
| 8,070,871 B2 | 12/2011 | Kawabe et al. |
| 8,188,179 B2 | 5/2012 | Nishiwaki et al. |
| 8,343,269 B2 | 1/2013 | Takahashi et al. |
| 8,425,027 B2 | 4/2013 | Nishiwaki et al. |
| 8,602,544 B2 | 12/2013 | Kawabe et al. |
| 8,814,341 B2 | 8/2014 | Nagao et al. |
| 8,834,621 B2 | 9/2014 | Takebayashi et al. |
| 8,871,013 B2 | 10/2014 | Sakai et al. |
| 8,876,962 B2 | 11/2014 | Yamamoto et al. |
| 8,987,348 B2 | 3/2015 | Mukae et al. |
| 9,187,662 B2 | 11/2015 | Yamamoto et al. |
| 9,388,322 B2 | 7/2016 | Kakikawa et al. |
| 2003/0184629 A1 | 10/2003 | Valentini et al. |
| 2006/0152570 A1 | 7/2006 | Ishikawa et al. |
| 2006/0194897 A1 | 8/2006 | Kawabe et al. |
| 2011/0192317 A1* | 8/2011 | Koganehira ......... C09D 11/322 106/31.9 |
| 2015/0159031 A1* | 6/2015 | Okamura ............. C09D 11/102 347/86 |
| 2016/0215152 A1 | 7/2016 | Yamamoto et al. |
| 2016/0215153 A1 | 7/2016 | Okazaki et al. |
| 2016/0215154 A1 | 7/2016 | Kawabe et al. |
| 2016/0215157 A1 | 7/2016 | Kakikawa et al. |

FOREIGN PATENT DOCUMENTS

| | | |
|---|---|---|
| JP | 2012-025866 A | 2/2012 |
| JP | 2013-035897 A | 2/2013 |

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

In recent years, the ink jet recording method enables recording of images having high definition and high color developability that are almost equivalent to those achieved by silver halide photography or offset printing. The coloring materials used in inks include dyes and pigments, and the pigments are widely used from the viewpoint of image toughness such as gas resistance, light resistance, and water resistance.

As inks are used in a wider variety of printing such as photo printing and graphic art printing, the inks have been required to have a wider color reproduction range. To meet such a requirement, various studies have been performed by adding, in addition to three primary color inks of cyan, magenta, and yellow inks, what are called particular color inks other than the three primary color inks, such as red, green, blue, orange, and violet inks, to expand the color reproduction range. Accordingly, a wider variety of pigment types have been used for ink jet recording methods. Examples of the pigment include phthalocyanine pigments conventionally widely used as the cyan pigment; quinacridone pigments widely used as the magenta pigment; and azo pigments widely used as the yellow pigment. In addition to these pigments, various types of pigments including diketopyrrolopyrrole pigments, dioxazine pigments, perinone pigments, perylene pigments, and anthraquinone pigments have been increasingly used.

In photo printing or graphic art printing, images having higher definition and excellent glossiness are required. Many of the inks applied to such applications contain what is called a resin-dispersed pigment which is dispersed by a resin dispersant. The resin dispersant has a hydrophobic unit through which the dispersant physically adsorbs the particle surface of a pigment, and has a hydrophilic unit having hydration force by which an intrinsically hydrophobic pigment is dispersed in an aqueous medium. A hydrophobic pigment is stably dispersed in an ink by the function of a resin dispersant. However, if the dispersion state becomes unstable to affect the ejection property of an ink from a recording head, image nonuniformity or other defects are likely to be caused. Accordingly, the requirement levels for the ejection property of inks become higher than ever before. In particular, when the ejection property of an ink change with an increase in the cumulative number of ejections from a recording head, image nonuniformity or other defects are caused due to a variation of the ejection property in accordance with the cumulative number of ejections of the corresponding nozzle. To address this problem, the ejection property of an ink is also required not to change even if the cumulative number of ejections varies.

The dispersion method for the resin-dispersed pigments used for ink jet inks is roughly classified into two methods including a media dispersion method and a medialess dispersion method. The media dispersion method is a dispersion method in which a media such as beads is used to apply physical force to the pigment, and uses a ball mill or a bead mill, for example. The medialess dispersion method is a dispersion method in which a liquid is used to generate a force such as shear stress and cavitation and the force is applied to a pigment, and uses a high speed homogenizer or a high pressure disperser, for example.

In the medialess dispersion method using a high speed homogenizer, the shear stress that can be applied to particles is limited. Thus, long time stirring may be needed, or the dispersible pigment types may be limited. The medialess dispersion method using a high pressure disperser may cause clogging in a chamber or may increase the number of times of passing needed for dispersion, and thus requires a long period of time for dispersion in many cases. On this account, not the medialess dispersion method but the media dispersion method is widely adopted mainly from the viewpoint of productivity and versatility.

Examples of the beads used in the media dispersion method include glass beads, alumina beads, and zirconia beads. Specifically, zirconia beads, which are beads having a high density, are widely used because the beads can apply a stronger force to a pigment. However, inks prepared by using a pigment that has been dispersed with the zirconia beads are known to contain zirconia due to abrasion of the beads, for example. Even if zirconia is contained, the content of zirconia in an aqueous ink is controlled to an extremely low level, for example, at most several tens of ppm in terms of zirconium (Zr). However, even at such a low content, in the case of a thermal system using thermal energy to eject an ink from a recording head, kogation containing zirconia and the like may deposit on a heater used for applying thermal energy.

When the kogation deposits on a heater, the thermal energy applied to an ink is reduced to deteriorate the ejection property. This causes a variation of the ejection property in accordance with the cumulative number of ejections. In other words, a nozzle with a small cumulative number of ejections has a good ejection property, whereas a nozzle with a large cumulative number of ejections has a poor ejection property, and this difference leads to image nonuniformity or other defects. What is called a piezo system that ejects an ink by deformation of a piezo element generates no kogation and thus does not cause a variation of the ejection property, image nonuniformity, or other problems due to kogation.

To suppress the kogation on a heater, an ink having a total content of particular metals such as zirconium, metal ions, and metal oxides of 30 ppm or less in terms of metal is disclosed (Japanese Patent Application Laid-Open No. 2001-187851). An ink including an azo pigment having a particular structure, a vinyl polymer containing a particular constituent unit, and a urethane resin is disclosed (Japanese Patent Application Laid-Open No. 2012-025866). As a method of improving the ejection stability, an ink including a pigment or a dye and a binder composed of a polyurethane resin produced by a particular method is disclosed (Japanese Patent Application Laid-Open No. 2013-035897). An ink including a self-dispersible pigment and two types of urethane resins is also disclosed (Japanese Patent Application Laid-Open No. 2005-515289).

The result of the study by the inventors of the present invention has revealed that the technique disclosed in Japanese Patent Application Laid-Open No. 2001-187851 gives advantageous effects when carbon black is used as the pigment but fails to give advantageous effects when a particular organic pigment is used. It is also revealed that the technique disclosed in Japanese Patent Application Laid-Open No. 2012-025866 gives advantageous effects on the kogation derived from a particular pigment but fails to give advantageous effects on the kogation due to zirconia in the ink. It is further revealed that the technique disclosed in Japanese Patent Application Laid-Open No. 2013-035897 does not cause abnormal ejection directions or ejection failure but causes a variation of the ejection property in accordance with the cumulative number of ejections. The self-dispersible pigment obtains dispersion performance by chemical treatment and is not typically dispersed by such a media dispersion method as described above. Hence, such an ink containing a coloring material that is a self-dispersible pigment as disclosed in Japanese Patent Application Laid-Open No. 2005-515289 contains no zirconium oxide as long as the zirconium oxide is intentionally added.

SUMMARY OF THE INVENTION

An object of the present invention is therefore to provide an ink to be ejected by a thermal system and can suppress a deterioration in ejection property due to kogation caused by zirconia. Another object of the present invention is to provide an ink cartridge and an ink jet recording method using the ink.

The above objects are achieved by the following present invention. In other words, the present invention provides an aqueous ink used in an ink jet recording method that uses thermal energy to eject an ink from a recording head to record an image on a recording medium. The aqueous ink includes zirconium oxide, a pigment, a first urethane resin, and a second urethane resin. In the aqueous ink, the content (ppm) of the zirconium oxide in terms of zirconium is 0.5 ppm or more to 20.0 ppm or less based on the total mass of the ink; the pigment is at least one pigment selected from the group consisting of phthalocyanine pigments, quinacridone pigments, diketopyrrolopyrrole pigments, dioxazine pigments, perinone pigments, perylene pigments, and anthraquinone pigments; each of the first urethane resin and the second urethane resin has a unit derived from a polyether polyol; the ratio of the weight-average molecular weight $Mw_1$ of the first urethane resin to the weight-average molecular weight $Mw_2$ of the second urethane resin is 0.20 times or more to 0.80 times or less; and the second urethane resin has a weight-average molecular weight $Mw_2$ of 20,000 or more to 70,000 or less.

The present invention can provide an ink to be ejected by a thermal system and can suppress a deterioration in ejection property due to kogation caused by zirconia. The present invention can also provide an ink cartridge and an ink jet recording method using the ink.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
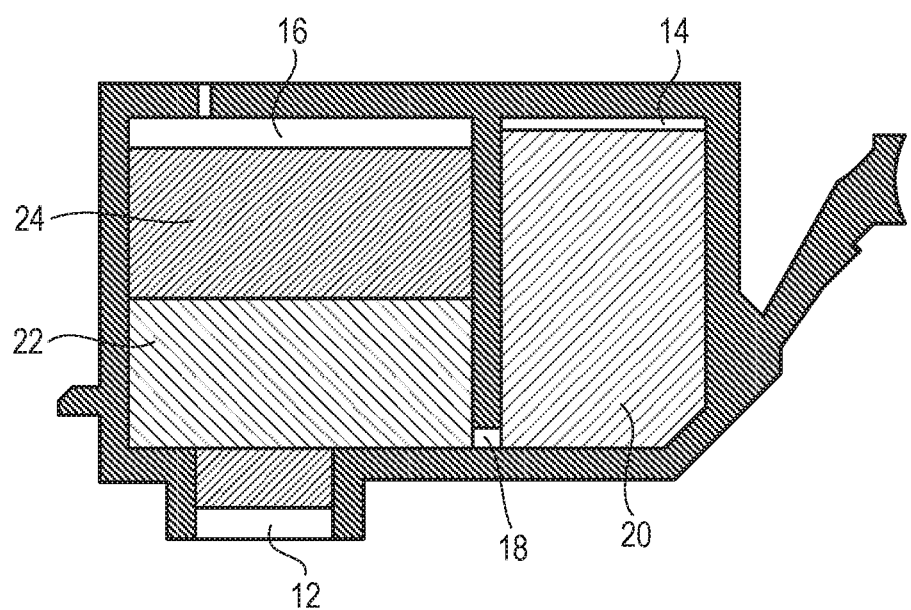
FIG. 1 is a schematic sectional view showing an embodiment of an ink cartridge of the present invention.

The present invention will now be described in detail with reference to preferred embodiments. In the present invention, if a compound is a salt, the salt dissociates into ions in an ink, but such an ink is expressed as "containing a salt" for convenience. An aqueous ink for ink jet may simply called "ink". Physical property values are values determined at normal temperature (25° C.) unless otherwise noted.

The inventors of the present invention have studied inks containing particular pigments (phthalocyanine pigments, quinacridone pigments, diketopyrrolopyrrole pigments, dioxazine pigments, perinone pigments, perylene pigments, and anthraquinone pigments) as the coloring material. As a result, it has been revealed that the dispersion state of the above particular pigments is destabilized by zirconium oxide in an ink that contains zirconium oxide at a content of 0.5 ppm or more in terms of zirconium concentration when thermal energy is applied for ejection. The pigment particles in a destabilized dispersion state are likely to deposit on a heater as kogation, and thus the ejection property is deteriorated by the kogation. The reason of deterioration of the ejection property by kogation when an ink containing such a particular pigment and a certain amount of zirconium oxide is ejected by the thermal system is supposed as follows.

The particular pigments have polar groups such as an N—H bond and a C=O bond in its molecular structure, and thus the particle surface of such a pigment has highly hydrophilic moieties. Such a moiety is unlikely to interact with the hydrophobic moiety of a resin dispersant, and thus not only has a weak adsorption power to the resin dispersant but also is likely to attract hydrophilic zirconium oxide. When energy for ejection is applied to such an ink, the resin dispersant is likely to desorb from the highly hydrophilic moiety of the particular pigment, and the presence of hydrophilic zirconium oxide is likely to prevent the resin dispersant from adsorbing. When the resin dispersant cannot adsorb to the pigment particle surface that would be stabilized by the adsorption of a resin dispersant, the pigment becomes in an unstable state in terms of surface energy. Here, the particular pigment has a structure in which a plurality of aromatic rings is connected, and thus the pigment particle surface has a lot of π electrons. These π electrons allow pigment particles to strongly interact with each other, and this makes the pigment dispersion state unstable. It is supposed that such a pigment in an unstable state in terms of surface energy deposits on a heater as kogation, and consequently the ejection property deteriorate. As the cumulative number of ejections is larger, a larger amount of kogation deposits, and thus the ejection property is more likely to deteriorate. In this manner, when the cumulative number of ejections varies among a plurality of nozzles, the deterioration degree of ejection property varies, and the variation appears as nonuniformity in images.

Hence, the inventors of the present invention have supposed that the deterioration of ejection property can be suppressed by stably maintaining the dispersion state of a pigment even when energy for ejection is applied to an ink, and have studied about various resins to be added to an ink other than the resin dispersant. The result has revealed that the deterioration of ejection property when an ink containing a certain amount of zirconium oxide is ejected from a recording head by thermal energy can be suppressed by an ink having the formulation satisfying the following conditions.

Condition (1): Containing a first urethane resin and a second urethane resin each having a unit derived from a polyether polyol.

Condition (2): Urethane resins having such weight-average molecular weights, $Mw_1$ and $Mw_2$, that the ratio $Mw_1/$ Mw$_2$ is 0.20 times or more to 0.80 times or less and the Mw$_2$ is 20,000 or more to 70,000 or less.

Figure 3:
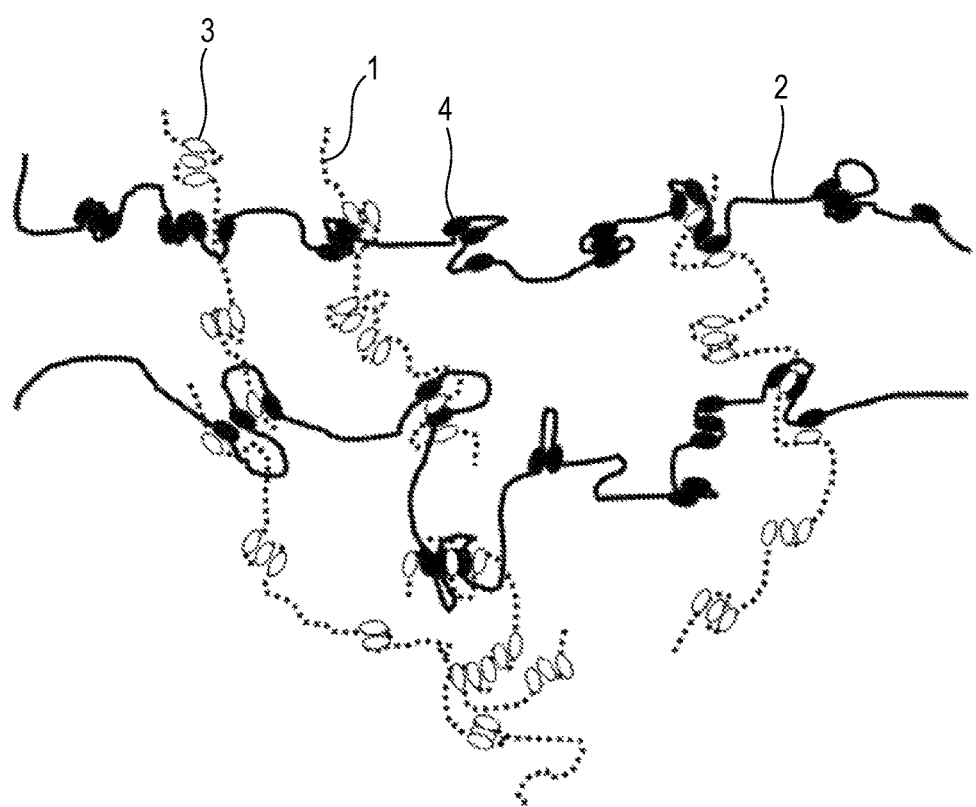
FIG. 3 is a schematic view showing a network structure formed from a first urethane resin and a second urethane resin.

The inventors of the present invention guess that the reason why use of two types of urethane resins satisfying such two conditions as above is effective in suppressing the deterioration of ejection property due to kogation is as follows. FIG. 3 is a schematic view showing a network structure formed from a first urethane resin and a second urethane resin. A urethane resin has a large number of urethane bonds (—NH—CO—O—) in its molecular chain and is likely to form hydrogen bonds. On this account, a urethane resin 1 having a comparatively low molecular weight and a urethane resin 2 having a comparatively high molecular weight relatively strongly interact with each other through urethane bonds 3 and 4 in an ink to form a network structure as shown in FIG. 3. Meanwhile, the unit derived from a polyether polyol in the urethane resin has moderate hydrophilicity, and this unit allows the urethane resins that form a network structure to be stably present in an aqueous ink. In addition, the unit derived from a polyether polyol also has moderate affinity with the highly hydrophilic moiety of a pigment. For such a reason, it is supposed that when energy for ejection is applied to an ink, the urethane resin has such functions as to protect the highly hydrophilic moiety of a pigment, or as to protect a moiety from which a resin dispersant is likely to desorb. By adding two types of the urethane resins that have such a function and satisfy the above weight-average molecular weight conditions to an ink, the deterioration of ejection property due to kogation caused by zirconia can be suppressed, but the deterioration cannot be suppressed by a single type of a urethane resin.

When two types of urethane resins satisfying the above Condition (2) are used, the network structure formed by these urethane resins (FIG. 3) has smaller mesh sizes and has a three-dimensionally tangled structure. Accordingly, there are a large number of action sites between the unit derived from a polyether polyol and the highly hydrophilic moiety of a pigment. Specifically, urethane resin chains having a smaller weight-average molecular weight are minutely folded around urethane resin chains having a larger weight-average molecular weight, and thus the urethane resin chains are likely to form such a structure as to be branched. On this account, the number of the above action sites can be efficiently increased. For such a reason, even when energy for ejection is applied to such an ink, the dispersion state of the pigment can be stably maintained. This suppresses the deposition of kogation on a heater and thus can prevent the deterioration of ejection property. It is therefore supposed that stable ejection property can be achieved independent of the cumulative number of ejections of each nozzle.

The result of the study by the inventors of the present invention has revealed that the technical problem of the deterioration of ejection property due to kogation caused by zirconia does not arise in inks containing carbon black or azo pigments, for example. The carbon black is a highly hydrophobic pigment. Accordingly, a resin dispersant is unlikely to desorb, and the adsorption of a resin dispersant to the pigment is not prevented by hydrophilic zirconium oxide. Thus, the dispersion state of the pigment is not destabilized in such a degree as to cause kogation. The azo pigment has a highly hydrophilic moiety on the particle surface thereof, but is unlikely to cause interaction between the pigment particles due to other structural parts thereof. In addition, zirconium oxide is also unlikely to adhere to the pigment. Thus, the dispersion state of the pigment is not destabilized in such a degree as to cause kogation. For these reasons, it is supposed that the kogation caused by zirconia is especially caused by particular pigments but is not caused by the carbon black or the azo pigment.

Ink

The aqueous ink of the present invention is an aqueous ink used in an ink jet recording method that uses thermal energy to eject an ink from a recording head to record an image on a recording medium, and contains zirconium oxide, a pigment, a first urethane resin, and a second urethane resin. Hereinafter, components constituting the ink of the present invention, physical properties of the ink, and the like will be described in detail. The present invention is not intended to be limited to the following description without departing from the scope of the invention.

Zirconium Oxide

The ink of the present invention contains zirconium oxide. Zirconium oxide is derived from contamination in the production process of an ink, such as a dispersion process of a pigment, and is contained unintentionally. Zirconium oxide is present typically as minute solid crystals in an ink. The crystals may contain other elements such as yttrium. The ink containing zirconium oxide can be identified by the following procedure. Thermal energy is used to eject an ink from a recording head, and kogation is allowed to deposit on a heater of the recording head. The kogation is sampled, and components in the kogation are analyzed by X-ray photoelectron spectroscopy (XPS), energy dispersive X-ray analysis (EDS), electron energy loss spectroscopy (EELS), or other techniques. An ink is considered to hardly contain zirconium compounds such as zirconium oxide derived from constituent materials of an aqueous ink except from the pigment dispersed by a resin dispersant. For example, if a trace amount of a zirconium compound derived from constituent materials such as water and water-soluble organic solvents is contained, the content thereof is less than the analyzable level. On this account, zirconium oxide can be supposed to be present in an ink if the presence of zirconium in the ink can be identified by inductively coupled plasma optical emission spectrometry (ICP-OES) as a simple method. For a similar reason, the content (ppm) of zirconium in an ink determined by ICP-OES can be supposed to be that derived from zirconium oxide.

The content of zirconium oxide in terms of zirconium can be calculated on the basis of zirconium concentration determined by inductively coupled plasma optical emission spectrometry (ICP-OES). The content (ppm) of zirconium oxide in terms of zirconium in an ink is 0.5 ppm or more to 20.0 ppm or less based on the total mass of the ink. If the content of zirconium is less than 0.5 ppm, the deterioration of ejection property due to kogation is not caused, and the ejection property is not changed in accordance with the cumulative number of ejections of each nozzle. If the content of zirconium is more than 20.0 ppm, the content of zirconium is excess, and the deterioration of ejection property cannot be suppressed even if any urethane resins are selected and added.

Pigment

The pigment contained in the ink of the present invention is at least one pigment selected from the group consisting of phthalocyanine pigments, quinacridone pigments, diketopyrrolopyrrole pigments, dioxazine pigments, perinone pigments, perylene pigments, and anthraquinone pigments. Examples of the phthalocyanine pigment include C.I. Pigment Blue 15:3, C.I. Pigment Blue 15:6, C.I. Pigment Green 7, C.I. Pigment Green 36, and C.I. Pigment Green 58. Examples of the quinacridone pigment include C.I. Pigment Red 122, C.I. Pigment Red 202, C.I. Pigment Violet 19, and solid solutions including a combination of C.I. Pigment Red 202 and C.I. Pigment Violet 19. Examples of the diketopyrrolopyrrole pigment include C.I. Pigment Red 254, C.I. Pigment Red 255, C.I. Pigment Red 264, C.I. Pigment Red 272, and C.I. Pigment Orange 71. Examples of the dioxazine pigment include C.I. Pigment Violet 23. Examples of the perinone pigment include C.I. Pigment Orange 43. Examples of the perylene pigment include C.I. Pigment Red 149. Examples of the anthraquinone pigment include C.I. Pigment Red 177. These pigments may be used singly or in combination of two or more of them. Such a pigment can also be used in combination with an additional pigment other than the above pigments.

The content (% by mass) of the pigment in the ink is preferably 0.20% by mass or more to 10.00% by mass or less based on the total mass of the ink. If the content of the pigment is less than 0.20% by mass, the color developability of images may deteriorate. If the content of the pigment is more than 10.00% by mass, the viscosity of an ink may excessively increase to cause poor ejection.

Resin Dispersant

The ink of the present invention contains a resin dispersant for dispersing the pigment in the ink. That is to say, a colorant to be used for the ink of the present invention is a resin-dispersed pigment which is a dispersion method of dispersing the pigment in the ink employing the resin dispersant. The resin-dispersed pigment is preferred from the viewpoint of a dispersion method for imparting high glossiness to images to be recorded. The resin dispersant typically has a unit having an anionic group (hydrophilic unit) and has a unit having no anionic group (hydrophobic unit). The hydrophilic unit is a unit for providing affinity with an aqueous medium. The hydrophobic unit is a unit for adsorption to the particle surface of a pigment through hydrophobic interaction. Examples of the pigment dispersed by such a dispersion method include a pigment which is dispersed by a resin dispersant that physically adsorbs to the pigment particle and a pigment which is dispersed in such a way that the pigment particle is encapsulated with a resin.

As the resin dispersant, a water-soluble resin is preferably used. The "water-soluble resin" in the present invention means a resin that can be dissolved in an aqueous medium and can be present in an aqueous medium in the state of not forming particles having particle sizes. If the resin dispersant is water-dispersible (water-insoluble), the storage stability of an ink is likely to be slightly reduced in some cases.

Whether a resin used as the resin dispersant is water-soluble can be determined by the following procedure. First, a liquid containing a resin (resin solid content: 10% by mass) that is neutralized by an alkali (such as sodium hydroxide and potassium hydroxide) in an amount corresponding to the acid value is prepared. Next, the prepared liquid is diluted 10-fold (in terms of volume) with pure water to prepare a sample solution. The particle size of the resin in the sample solution is then determined by dynamic light scattering. When particles having particle sizes are not observed, such a resin can be determined to be water-soluble. The conditions for the measurement are as follows.

Measurement Conditions
Set-Zero: 30 seconds
Number of measurements: three times
Measurement time: 180 seconds As the particle size distribution analyzer, a particle size analyzer by dynamic light scattering (for example, trade name "UPA-EX150", manufactured by NIKKISO CO., LTD.) can be used, for example. Needless to say, the particle size distribution analyzer, the measurement conditions, and the like are not limited to the above.

Specifically, as the resin dispersant, a (meth)acrylic resin having a unit with an anionic group (hydrophilic unit) and a unit with no anionic group (hydrophobic unit) is preferably used. In the below description, "(meth)acrylic" means "acrylic" and "methacrylic", and "(meth)acrylate" means "acrylate" and "methacrylate".

The unit with an anionic group (hydrophilic unit) can be formed by polymerization of a monomer having an anionic group, for example. Specific examples of the monomer having an anionic group include monomers having a carboxy group, such as (meth)acrylic acid, itaconic acid, maleic acid, and fumaric acid, and anhydrides and salts of these monomers. Examples of the cation constituting the salt of a monomer having an anionic group include a lithium ion, a sodium ion, a potassium ion, an ammonium ion, and organic ammonium ions.

The unit with no anionic group (hydrophobic unit) can be formed by polymerization of a monomer having no anionic group, for example. Specific examples of the monomer having no anionic group include monomers having an aromatic ring, such as styrene, α-methylstyrene, benzyl (meth)acrylate, 2-vinylpyridine, 4-vinylpyridine, and 1-vinylimidazole; and monomers having an aliphatic group, such as ethyl (meth)acrylate, methyl (meth)acrylate, (iso) propyl (meth)acrylate, (n-, iso-, t-)butyl (meth)acrylates, and 2-ethylhexyl (meth)acrylate.

In the ink, the pigment preferably has a volume-average particle size of 10 nm or more to 300 nm or less, and more preferably 20 nm or more to 200 nm or less. The volume-average particle size of a pigment can be determined by using a dynamic light scattering particle size analyzer.

The ink of the present invention contains three resins including a resin dispersant, a first urethane resin, and a second urethane resin. The type of the resin dispersing a pigment in an ink that contains a plurality types of resins can be determined by the following procedure. An ink is concentrated or diluted to prepare a liquid having a total solid content of about 10% by mass. The prepared liquid is centrifuged at 12,000 rpm for 1 hour. By the centrifugation, a liquid layer containing a water-soluble organic solvent, resins not contributing to the dispersion, and the like is separated from a precipitate containing the pigment, and the precipitate is recovered. The resin contained in the precipitate recovered in this manner is considered as the resin dispersing the pigment. In other words, the resin contained as the main component in the precipitate is the resin contributing to the dispersion of the pigment (resin dispersant). Meanwhile, the resin contained as the main component in the liquid layer is a resin not contributing to the dispersion of the pigment.

Urethane Resin

The ink of the present invention contains a first urethane resin and a second urethane resin having different weight-average molecular weights. The addition of urethane resins to an ink enables an improvement in glossiness of images to be recorded. If a single type of urethane resin is added, the deterioration of ejection property cannot be suppressed. An ink containing at least two urethane resins that satisfy the relation described below may contain three or more types of urethane resins. In the present invention, a urethane resin having a comparatively small weight-average molecular weight is called "first urethane resin", and a urethane resin having a comparatively large weight-average molecular weight is called "second urethane resin", for convenience. In the present invention, the weight-average molecular weight of a urethane resin is a value determined by gel permeation chromatography (GPC) in terms of polystyrene.

The ratio of the weight-average molecular weight $Mw_1$ of the first urethane resin to the weight-average molecular weight $Mw_2$ of the second urethane resin ($Mw_1/Mw_2$) is required to be 0.20 times or more to 0.80 times or less. The second urethane resin is required to have a weight-average molecular weight $Mw_2$ of 20,000 or more to 70,000 or less. If the above ratio is less than 0.20 times, the interaction between the first urethane resin and the second urethane resin is excessively strong. Accordingly, the interaction between the first urethane resin and the pigment becomes relatively weak, and thus the deterioration of ejection property cannot be suppressed. If the ratio is more than 0.80 times, such a large molecular weight causes steric hindrance. Accordingly, the first urethane resin of urethane resins forming a network structure is unlikely to interact with the pigment, and thus the deterioration of ejection property cannot be suppressed. If the second urethane resin has a weight-average molecular weight $Mw_2$ of less than 20,000, the second urethane resin has a smaller number of urethane bonds. Such a resin is unlikely to interact with the first urethane resin, and thus the deterioration of ejection property cannot be suppressed. If the second urethane resin has a weight-average molecular weight $Mw_2$ of more than 70,000, such a large molecular weight causes steric hindrance. Accordingly, the urethane resins having a network structure are unlikely to be present close to the pigment, and thus the deterioration of ejection property cannot be suppressed. The second urethane resin preferably has a weight-average molecular weight $Mw_2$ of 25,000 or more to 60,000 or less from the viewpoint of further improving the ejection property.

The first urethane resin preferably has a weight-average molecular weight $Mw_1$ of 5,000 or more to 30,000 or less. If $Mw_1$ is less than 5,000, the first urethane resin has a small number of urethane bonds. Such a resin does not sufficiently interact with the second urethane resin, and thus the suppression degree of the deterioration of ejection property may be slightly reduced. If $Mw_1$ is more than 30,000, such a large molecular weight causes steric hindrance. Accordingly, the urethane resins having a network structure are unlikely to be present close to the pigment, and thus the suppression degree of the deterioration of ejection property may be slightly reduced. The first urethane resin more preferably has a weight-average molecular weight $Mw_1$ of 10,000 or more to 20,000 or less. If $Mw_1$ is less than 10,000, the first urethane resin is unlikely to remain in a pigment layer. Thus, the glossiness of images may not be sufficiently achieved. If $Mw_1$ is more than 20,000, unevenness is likely to be caused on the surface of images. Thus, the glossiness of images may not be sufficiently achieved.

The first urethane resin preferably has an acid value of 30 mg KOH/g or more to 100 mg KOH/g or less. The second urethane resin preferably has an acid value of 30 mg KOH/g or more to 100 mg KOH/g or less.

In the ink, the content (% by mass) of the second urethane resin is preferably 0.02% by mass or more to 2.00% by mass or less based on the total mass of the ink. If the content of the second urethane resin is less than 0.02% by mass, the first urethane resin and the second urethane resin do not sufficiently interact in the network structure of the urethane resins. Thus, the suppression degree of the deterioration of ejection property may be slightly reduced. If the content of the second urethane resin is more than 2.00% by mass, the second urethane resin is likely to cause aggregation. Such a resin is unlikely to interact with the pigment particle surface or the first urethane resin, and thus the suppression degree of the deterioration of ejection property may be slightly reduced. In the ink, the content (% by mass) of the second urethane resin is more preferably 0.10% by mass or more to 0.80% by mass or less.

In the ink, the content (% by mass) of the first urethane resin is preferably 0.02% by mass or more to 2.00% by mass or less based on the total mass of the ink. If the content of the first urethane resin is less than 0.02% by mass, the amount of the structural parts of the first urethane resin where the first urethane resin interacts with a highly hydrophilic moiety of the pigment (units derived from a polyether polyol) is small. Thus, the suppression degree of the deterioration of ejection property may be slightly reduced. If the content of the first urethane resin is more than 2.00% by mass, the first urethane resin is likely to cause aggregation. Such a resin is unlikely to interact with the pigment particle surface or the second urethane resin, and thus the suppression degree of the deterioration of ejection property may be slightly reduced. In the ink, the content (% by mass) of the first urethane resin is more preferably 0.05% by mass or more to 0.80% by mass or less.

In the ink, the total content (% by mass) of the urethane resins is preferably 0.10% by mass or more to 2.00% by mass or less, and more preferably 0.20% by mass or more to 1.00% by mass or less based on the total mass of the ink. In the ink, the mass ratio of the content (% by mass) of the first urethane resin to the content (% by mass) of the second urethane resin is preferably 0.50 times or more. If the mass ratio is less than 0.50 times, the amount of the first urethane resin is excessively small relative to that of the second urethane resin. This easily causes unevenness on the surface of images, and thus the glossiness of images may not be sufficiently achieved. The above mass ratio is preferably 200.00 times or less, and more preferably 100.00 times or less.

The urethane resins used in the ink of the present invention can be prepared by allowing a polyisocyanate and a polyether polyol to react. In addition to these components, a chain extender may be further allowed to react. As the polyisocyanate, aliphatic polyisocyanates and aromatic polyisocyanates can be used, for example. Specific examples of the aliphatic polyisocyanate include polyisocyanates having a linear structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane 1,5-diisocyanate, and 3-methylpentane 1,5-diisocyanate; polyisocyanates having a cyclic structure, such as isophorone diisocyanate, hydrogenated xylylene diisocyanate, 4,4'-dicyclohexylmethane diisocyanate, methylcyclohexylene diisocyanate, and 1,3-bis(isocyanate methyl)cyclohexane; and 1,4-cyclohexane diisocyanate.

Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and $\alpha,\alpha,\alpha',\alpha'$-tetramethylxylylene diisocyanate.

As the polyol, a polyether polyol is used. In addition to this, polyester polyols, polycarbonate polyols, and polyols having an anionic group can be used, for example.

Examples of the polyether polyol include addition polymers of alkylene oxides and polyols; and glycols such as (poly)alkylene glycols. Examples of the alkylene oxide include ethylene oxide, propylene oxide, butylene oxide, and $\alpha$-olefin oxides. Examples of the polyol to be subjected to addition polymerization with the alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea, and derivatives thereof; and triols such as glycerol, trimethylolpropane, 1,2,5-hexanetriol, 1,2,6-hexanetriol, pentaerythritol, trimethylol melamine and derivatives thereof, and polyoxypropylenetriol. Examples of the glycol include (poly)alkylene glycols such as hexamethylene glycol, tetramethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, and neopentyl glycol; and ethylene glycol-propylene glycol copolymers.

Specifically preferred are glycols such as polyethylene glycol, polypropylene glycol, and polytetramethylene glycol. In the urethane resin, the proportion of the units derived from glycols is preferably 90.0% by mass or more in the units derived from polyols having no anionic group. The proportion is preferably 100.0% by mass, or all the units derived from polyols having no anionic group are preferably the units derived from glycols.

In the first urethane resin and the second urethane resin, units derived from polyether polyols are preferably the following combinations. In other words, it is preferred that one of the first urethane resin and the second urethane resin have a unit derived from polypropylene glycol and the other have a unit derived from at least one of polypropylene glycol and polytetramethylene glycol.

This is supposed to relate to the hydrophilicity and hydrophobicity of a polyol and to branched chains of a polyol. As described above, the unit derived from a polyether polyol is required to have moderate affinity with a highly hydrophilic moiety of a pigment. The hydrophilicity and hydrophobicity of the polypropylene glycol provides optimum affinity with the highly hydrophilic moiety of a pigment, and the polypropylene glycol has a branched structure. Thus, the interaction between the units derived from a polyether polyol is suppressed. For these reasons, such urethane resins are supposed to be optimum for stably maintaining the dispersion state of particular pigments. The polytetramethylene glycol has higher hydrophobicity as compared with the polypropylene glycol and has a linear structure. Thus, the interaction between the polytetramethylene glycol and a particular pigment becomes weak as compared with the polypropylene glycol. However, if a urethane resin having the unit derived from polytetramethylene glycol is present together with a urethane resin having the unit derived from polypropylene glycol, it is supposed that the dispersion state of a particular pigment can be stably maintained.

The urethane resin preferably has, in the structure thereof, an anionic group such as a carboxylic acid group, a sulfonic acid group, a phosphoric acid group, and a phosphonic acid group, a carbonyl group, or a hydroxy group, for example. These groups are hydrophilic groups, and thus such a urethane resin can be more stably present in an aqueous ink. In particular, a urethane resin synthesized by using a diol having an anionic group such as dimethylolpropionic acid and dimethylolbutanoic acid is preferably used. The anionic group may be in a salt form. Examples of the cation constituting the salt include a lithium ion, a sodium ion, a potassium ion, an ammonium ion, and organic ammonium ions. In each urethane resin, 90.0% by mass or more of the units giving acid value are preferably units derived from diols having an anionic group. Specifically, all the units giving acid value in each urethane resin are particularly preferably units derived from diols having an anionic group.

The chain extender is a compound capable of reacting with a remaining isocyanate group that fails to form a urethane bond among the polyisocyanate units in the urethane prepolymer prepared by allowing a polyisocyanate and a polyol to react. As the chain extender, polyvalent amines such as dimethylol ethylamine, ethylenediamine, and diethylenetriamine; polyvalent imines such as polyethylene polyimine; and polyhydric alcohols such as neopentyl glycol and butylethylpropanediol can be used. Each urethane resin contained in the ink of the present invention is preferably not crosslinked.

Aqueous Medium

The ink of the present invention is an aqueous ink at least containing water as the aqueous medium. The aqueous medium may further contain a water-soluble organic solvent. As the water, deionized water (ion-exchanged water) is preferably used. In the ink, the content (% by mass) of water is preferably 10.00% by mass or more to 90.00% by mass or less based on the total mass of the ink.

The water-soluble organic solvent may be any organic solvent that is water-soluble. As the water-soluble organic solvent, an alcohol, a polyhydric alcohol, a polyglycol, a glycol ether, a nitrogen-containing polar solvent, or a sulfur-containing polar solvent can be used, for example. Specifically, at least a water-soluble organic solvent such as polyethylene glycols having a number-average molecular weight of about 200 to 2,000 and 1,2-alkanediols is preferably used. In the ink, the content (% by mass) of the water-soluble organic solvent is preferably 3.00% by mass or more to 50.00% by mass or less, and more preferably 15.00% by mass or more to 40.00% by mass or less based on the total mass of the ink. If the content of the water-soluble organic solvent is out of the above range in an ink, such an ink may cause poor ejection.

Other Resins

The ink of the present invention may contain additional resins (other resins) other than the above urethane resins. The type and form of the other resin are not limited as long as the resin can be stably present in an aqueous ink. Examples of such other resin include (meth)acrylic resins, polyamide resins, polyester resins, polyvinyl alcohol resins, and polyolefin resins. In order to improve the solubility of such a resin, a base may be added. As the base, an organic amine such as monoethanolamine, diethanolamine, triethanolamine, amine methylpropanol, and N,N-dimethylethanolamine; or an inorganic base such as potassium hydroxide and sodium hydroxide can be used, for example.

Other Additives

The ink of the present invention may contain, in addition to the above components, water-soluble organic compounds that are solid at normal temperature, including polyhydric alcohols such as trimethylolpropane and trimethylolethane, and urea and derivatives thereof, as needed. The ink of the present invention may further contain various additives such as a surfactant, a pH adjuster, an anticorrosive, an antiseptic agent, an antifungal agent, an antioxidant, a reduction inhibitor, an evaporation accelerator, a chelating agent, and a water-soluble resin, as needed.

Ink Cartridge

The ink cartridge of the present invention includes an ink and an ink storage portion for storing the ink. The ink stored in the ink storage portion is the above-described ink of the present invention. FIG. 1 is a schematic sectional view showing an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20. The absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

Ink Jet Recording Method

The ink jet recording method of the present invention is a method in which the above-described ink of the present invention is ejected from an ink jet recording head to record an image on a recording medium. As the ink ejection system, a system in which thermal energy is applied to an ink is adopted. The steps of the ink jet recording method may be known steps except that the ink of the present invention is used.

Figure 2A:
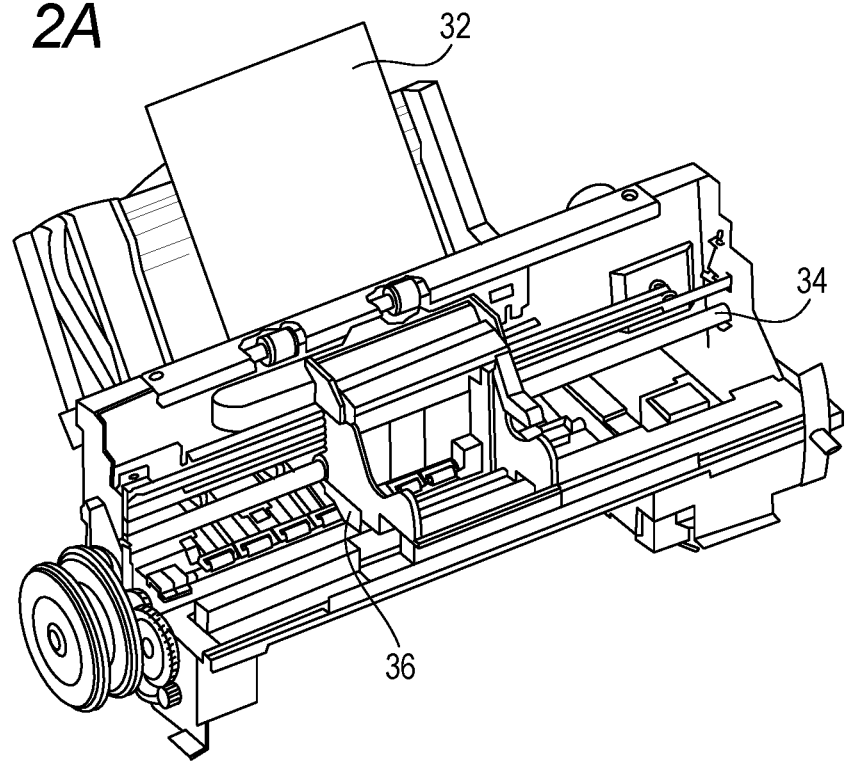
FIGS. 2A and 2B are schematic views of an example of an ink jet recording apparatus used in an ink jet recording method of the present invention.
Figure 2B:
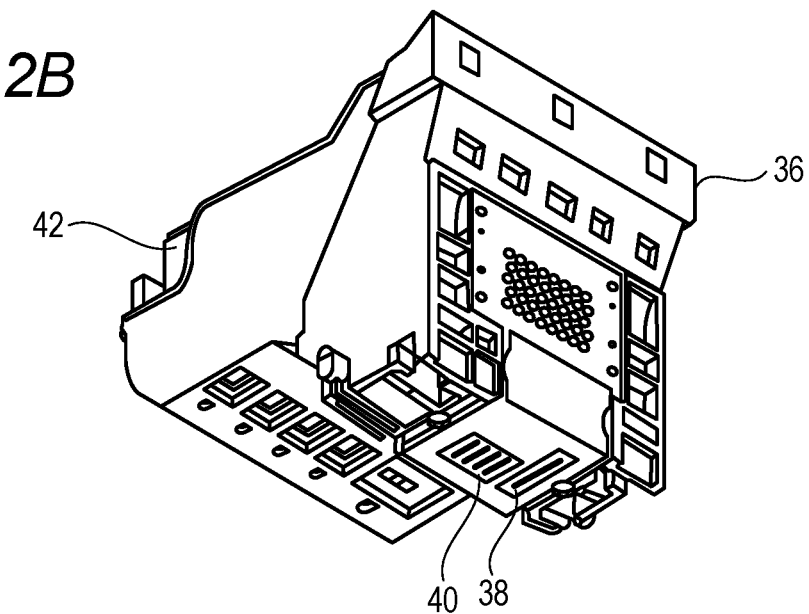

FIGS. 2A and 2B are schematic views of an example of an ink jet recording apparatus used in the ink jet recording method of the present invention; FIG. 2A is a perspective view of a principal part of the ink jet recording apparatus; and FIG. 2B is a perspective view of a head cartridge. The ink jet recording apparatus includes a conveyance unit (not illustrated) for conveying a recording medium 32 and a carriage shaft 34. On the carriage shaft 34, a head cartridge 36 can be installed. The head cartridge 36 includes recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The objective recording medium for recording by using the ink of the present invention may be any recording medium, but is preferably a paper having permeability, such as plain paper and recording media having a coating layer (glossy paper and art paper, for example). It is particularly preferred to use a recording medium having a coating layer that allows at least some of the pigment particles in the ink to be present on the surface of the recording medium or in the vicinity thereof. Such a recording medium can be selected in accordance with an intended use purpose of a recorded article on which an image is recorded. Examples of the recording medium include glossy papers that are suitable for giving images having glossiness of photographic image quality and art papers that take advantage of substrate textures (for example, a drawing-paper-like texture, a canvas-like texture, and a Japanese paper-like texture) in order to express preferred images such as pictures, photographs, and graphic images. Specifically, what is called a glossy paper having a glossy surface of a coating layer is particularly preferably used.

EXAMPLES

The present invention will next be described in further detail with reference to examples and comparative examples, but the invention is not intended to be limited to the following examples without departing from the scope of the invention. The component amounts with "part" or "%" are based on mass unless otherwise noted.

Synthesis of Urethane Resin

In a four-necked flask equipped with a thermometer, a stirrer, a nitrogen inlet tube, and a condenser, a polyol and a polyisocyanate in amounts (unit: parts) shown in Tables 1-1 to 1-6 and 0.007 part of dibutyltin dilaurate were fed. The whole was reacted in a nitrogen gas atmosphere at 100° C. for 5 hours. The mixture was cooled to 65° C. or less, then a diol having an anionic group and a chain extender in amounts shown in Tables 1-1 to 1-6 and 150.0 parts of methyl ethyl ketone were added to conduct reaction at 80° C. The reaction mixture was cooled to 40° C., and then 20.0 parts of methanol was added to terminate the reaction. An appropriate amount of ion-exchanged water was added, and a 10.0% aqueous solution of potassium hydroxide was added in an amount required for neutralization of the anionic group of the resin while the mixture was stirred with a homomixer. The methyl ethyl ketone and the unreacted methanol were distilled off under heating and reduced pressure, giving aqueous solutions of urethane resins 1 to 66 having a resin content (solid content) of 10.0%. The weight-average molecular weights of the urethane resins were adjusted by appropriately changing the reaction time at 80° C.

To the obtained aqueous solution, hydrochloric acid was added dropwise. The precipitated urethane resin was separated and was dried under vacuum at 40° C. overnight, giving a urethane resin in a solid form. The obtained urethane resin was dissolved in tetrahydrofuran, and the resulting solution was used as a sample for measurements of acid value and weight-average molecular weight. The acid value of the urethane resin was determined by using an automatic potentiometric titrator (manufactured by Kyoto Electronics Manufacturing Co., Ltd.) by potentiometric titration with a potassium hydroxide/ethanol titration solution. The weight-average molecular weight of the urethane resin was determined by gel permeation chromatography (GPC) as a value in terms of polystyrene. As the measurement apparatus, a GPC (trade name "Alliance GPC 2695", manufactured by Waters) was used. As the column, four columns (trade name "Shodex KF-806M" manufactured by Showa Denko K. K.) were connected and used. As the detector, a refractive index (RI) detector (trade name "2414 Detector", manufactured by Waters) was used. As the standard polystyrene sample, PS-1 and PS-2 (manufactured by Polymer Laboratories) were used. The acid values and the weight-average molecular weights of the urethane resins are shown in Tables 1-1 to 1-6.

The abbreviations of the monomers in Tables 1-1 to 1-6 are as shown below. The numerical values attached to the abbreviations indicate the number-average molecular weights of polyols.

PPG: polypropylene glycol
PTMG: polytetramethylene glycol
PEG: polyethylene glycol
PCD: polyhexamethylene carbonate diol
PEA: polyethylene adipate
PBA: polybutylene adipate
IPDI: isophorone diisocyanate
HDI: hexamethylene diisocyanate TDI: 2,6-toluene diisocyanate
MDI: diphenylmethane diisocyanate
XDI: xylylene diisocyanate
DMPA: dimethylolpropionic acid
DMBA: dimethylolbutanoic acid
NPG: neopentyl glycol 14BD: 1,4-butanediol
GLY: glycerol
TMP: trimethylolpropane
EDA: ethylenediamine
DETA: diethylenetriamine

TABLE 1-1

Synthetic conditions and properties of urethane resins

| | Amount of monomer (parts) | | | | | Properties | |
|---|---|---|---|---|---|---|---|
| | Polyol | | | Diol having | Chain | Acid | Weight-average |
| No. | PPG 1,000 | PTMG 2,000 | Polyisocyanate IPDI | anionic group DMPA | extender NPG | value (mgKOH/g) | molecular weight |
| 1 | 240.0 | | 282.0 | 118.0 | 447.8 | 55 | 15,000 |
| 2 | | 240.0 | 282.0 | 118.0 | 447.8 | 55 | 30,000 |
| 3 | 240.0 | | 282.0 | 118.0 | 447.8 | 56 | 11,000 |
| 4 | | 240.0 | 282.0 | 118.0 | 447.8 | 54 | 54,000 |
| 5 | 240.0 | | 282.0 | 118.0 | 447.8 | 55 | 24,000 |
| 6 | 240.0 | | 282.0 | 118.0 | 447.8 | 58 | 9,500 |
| 7 | 240.0 | | 282.0 | 118.0 | 447.8 | 56 | 25,000 |
| 8 | | 240.0 | 282.0 | 118.0 | 447.8 | 55 | 20,000 |
| 9 | | 240.0 | 282.0 | 118.0 | 447.8 | 55 | 70,000 |
| 10 | | 240.0 | 282.0 | 118.0 | 447.8 | 55 | 19,000 |
| 11 | | 240.0 | 282.0 | 118.0 | 447.8 | 54 | 72,000 |
| 12 | 240.0 | | 282.0 | 118.0 | 447.8 | 53 | 5,000 |
| 13 | 240.0 | | 282.0 | 118.0 | 447.8 | 55 | 30,000 |
| 14 | 240.0 | | 282.0 | 118.0 | 447.8 | 58 | 4,800 |
| 15 | 240.0 | | 282.0 | 118.0 | 447.8 | 54 | 31,000 |
| 16 | 240.0 | | 282.0 | 118.0 | 447.8 | 51 | 10,000 |
| 17 | | 240.0 | 282.0 | 118.0 | 447.8 | 54 | 25,000 |
| 18 | 240.0 | | 282.0 | 118.0 | 447.8 | 54 | 20,000 |
| 19 | | 240.0 | 282.0 | 118.0 | 447.8 | 55 | 60,000 |
| 20 | | 240.0 | 282.0 | 118.0 | 447.8 | 55 | 24,000 |
| 21 | 240.0 | | 282.0 | 118.0 | 447.8 | 58 | 21,000 |
| 22 | | 240.0 | 282.0 | 118.0 | 447.8 | 56 | 62,000 |
| 23 | 240.0 | | 282.0 | 60.0 | 447.8 | 30 | 15,000 |
| 24 | | 240.0 | 282.0 | 60.0 | 447.8 | 30 | 30,000 |
| 25 | 240.0 | | 282.0 | 255.0 | 447.8 | 100 | 15,000 |
| 26 | | 240.0 | 282.0 | 255.0 | 447.8 | 100 | 30,000 |
| 27 | 240.0 | | 282.0 | 56.0 | 447.8 | 29 | 15,000 |
| 28 | | 240.0 | 282.0 | 56.0 | 447.8 | 29 | 30,000 |
| 29 | 240.0 | | 282.0 | 272.0 | 447.8 | 105 | 15,000 |
| 30 | | 240.0 | 282.0 | 272.0 | 447.8 | 105 | 30,000 |

TABLE 1-2

Synthetic conditions and properties of urethane resins

| | Polyol | | | | | | | Diol having | Chain | Properties | |
|---|---|---|---|---|---|---|---|---|---|---|---|
| | | | | | | | | | | Acid | Weight-average |
| No. | PPG 2,000 | PTMG 1,000 | PEG 1,000 | PCD 1,000 | PEA 1,000 | PBA 1,000 | Polyisocyanate IPDI | anionic group DMPA | extender NPG | value (mgKOH/g) | molecular weight |
| 31 | 240.0 | | | | | | 282.0 | 118.0 | 447.8 | 55 | 30,000 |
| 32 | | 240.0 | | | | | 282.0 | 118.0 | 447.8 | 54 | 30,000 |
| 33 | | | 240.0 | | | | 282.0 | 118.0 | 447.8 | 55 | 30,000 |
| 34 | | | | 240.0 | | | 282.0 | 118.0 | 447.8 | 56 | 30,000 |
| 35 | | | | | 240.0 | | 282.0 | 118.0 | 447.8 | 55 | 30,000 |
| 36 | | | | | | 240.0 | 282.0 | 118.0 | 447.8 | 55 | 30,000 |
| 37 | 240.0 | | | | | | 282.0 | 118.0 | 447.8 | 53 | 15,000 |
| 38 | | 240.0 | | | | | 282.0 | 118.0 | 447.8 | 56 | 15,000 |
| 39 | | | 240.0 | | | | 282.0 | 118.0 | 447.8 | 55 | 15,000 |
| 40 | | | | 240.0 | | | 282.0 | 118.0 | 447.8 | 55 | 15,000 |
| 41 | | | | | 240.0 | | 282.0 | 118.0 | 447.8 | 55 | 15,000 |
| 42 | | | | | | 240.0 | 282.0 | 118.0 | 447.8 | 53 | 15,000 |

TABLE 1-3

Synthetic conditions and properties of urethane resins

| | Polyol PTMG | Polyisocyanate | | | | | Diol having anionic group | | Chain extender | Properties | |
| | | | | | | | | | | Acid value | Weight-average molecular |
| No. | 2,000 | IPDI | HDI | TDI | MDI | XDI | DMPA | DMBA | NPG | (mgKOH/g) | weight |
|---|---|---|---|---|---|---|---|---|---|---|---|
| 43 | 240.0 | | 202.0 | | | | 110.0 | | 447.8 | 58 | 30,000 |
| 44 | 240.0 | 141.0 | 101.0 | | | | 114.0 | | 447.8 | 56 | 30,000 |
| 45 | 240.0 | | | 210.0 | | | 110.0 | | 447.8 | 56 | 30,000 |
| 46 | 240.0 | | | | 300.0 | | 118.0 | | 447.8 | 55 | 30,000 |
| 47 | 240.0 | | | | | 230.0 | 110.0 | | 447.8 | 57 | 30,000 |
| 48 | 240.0 | 282.0 | | | | | | 135.0 | 447.8 | 55 | 30,000 |

TABLE 1-4

Synthetic conditions and properties of urethane resins

| | Polyol PTMG | Polyisocyanate | Diol having anionic group | Chain extender | | | | | Properties | |
| | | | | | | | | | Acid value | Weight-average molecular |
| No. | 2,000 | IPDI | DMPA | 14BD | GLY | TMP | EDA | DETA | (mgKOH/g) | weight |
|---|---|---|---|---|---|---|---|---|---|---|
| 49 | 240.0 | 282.0 | 118.0 | 400.0 | | | | | 58 | 30,000 |
| 50 | 240.0 | 282.0 | 118.0 | | 400.0 | | | | 57 | 30,000 |
| 51 | 240.0 | 282.0 | 130.0 | | | 576.0 | | | 54 | 30,000 |
| 52 | 240.0 | 282.0 | 90.0 | | | | 260.0 | | 55 | 30,000 |
| 53 | 240.0 | 282.0 | 118.0 | | | | | 432.0 | 57 | 30,000 |

TABLE 1-5

Synthetic conditions and properties of urethane resins

| | Amount of monomer (parts) | | | | | | | | Properties | |
| | Polyol PPG | Polyisocyanate | | | | | Diol having anionic group | Chain extender | Acid value | Weight-average molecular |
| No. | 1,000 | IPDI | HDI | TDI | MDI | XDI | DMPA | NPG | (mgKOH/g) | weight |
|---|---|---|---|---|---|---|---|---|---|---|
| 54 | 240.0 | | 202.0 | | | | 110.0 | 447.8 | 58 | 15,000 |
| 55 | 240.0 | 141.0 | 101.0 | | | | 114.0 | 447.8 | 55 | 15,000 |
| 56 | 240.0 | | | 210.0 | | | 110.0 | 447.8 | 56 | 15,000 |
| 57 | 240.0 | | | | 300.0 | | 118.0 | 447.8 | 55 | 15,000 |
| 58 | 240.0 | | | | | 230.0 | 110.0 | 447.8 | 58 | 15,000 |

TABLE 1-6

Synthetic conditions and properties of urethane resins

| | Amount of monomer (parts) | | | | | | | | | | | Properties | |
| | Polyol | | Polyisocyanate | Diol having anionic group | | | Chain extender | | | | | Acid value | Weight-average molecular |
| No. | PPG 1,000 | PPG 2,000 | IPDI | DMPA | DMBA | NPG | 14BD | GLY | TMP | EDA | DETA | (mgKOH/g) | weight |
|---|---|---|---|---|---|---|---|---|---|---|---|---|---|
| 59 | 240.0 | | 282.0 | | 135.0 | 447.8 | | | | | | 55 | 15,000 |
| 60 | 240.0 | | 282.0 | 118.0 | | | 400.0 | | | | | 59 | 15,000 |
| 61 | 240.0 | | 282.0 | 118.0 | | | | 400.0 | | | | 57 | 15,000 |
| 62 | 240.0 | | 282.0 | 130.0 | | | | | 576.0 | | | 56 | 15,000 |
| 63 | 240.0 | | 282.0 | 90.0 | | | | | | 260.0 | | 55 | 15,000 |

TABLE 1-6-continued

Synthetic conditions and properties of urethane resins

| | Amount of monomer (parts) | | | | | | | | | | | Properties | |
|---|---|---|---|---|---|---|---|---|---|---|---|---|---|
| | Polyol | | | Diol having anionic group | | | | | | | | | Weight-average |
| | PPG | PPG | Polyisocyanate | | | Chain extender | | | | | | Acid value | molecular |
| No. | 1,000 | 2,000 | IPDI | DMPA | DMBA | NPG | 14BD | GLY | TMP | EDA | DETA | (mgKOH/g) | weight |
| 64 | 240.0 | | 282.0 | 118.0 | | | | | | | 432.0 | 55 | 15,000 |
| 65 | | 240.0 | 282.0 | 118.0 | | 447.8 | | | | | | 54 | 54,000 |
| 66 | | 240.0 | 282.0 | 118.0 | | 447.8 | | | | | | 56 | 25,000 |

Synthesis of Acrylic Resin

In a four-necked flask equipped with a thermometer, a stirrer, a nitrogen inlet tube, and a condenser, 200.0 parts of methyl ethyl ketone was fed, and the reaction system was purged with nitrogen. Separately, a mixture of 25.0 parts of benzyl acrylate, 35.0 parts of styrene, 5.0 parts of 2-ethoxyethyl acrylate, 15.0 parts of methyl methacrylate, 20.0 parts of acrylic acid, and 2.0 parts of t-butyl peroxide (polymerization initiator) was prepared. The temperature of the reaction system was increased to 80° C., and the prepared mixture was added dropwise over 2 hours. The mixture was then allowed to react at 80° C. for 14 hours, giving an acrylic resin. A 10.0% aqueous solution of potassium hydroxide was added in an amount required for neutralization of the anionic group of the resin, and then an appropriate amount of ion-exchanged water was added, giving an aqueous solution of the acrylic resin having a resin content (solid content) of 20.0%. The acrylic resin had an acid value of 156 mg KOH/g and a weight-average molecular weight of 33,000. The acid value and the weight-average molecular weight of the acrylic resin were determined by using the obtained aqueous solution as a sample for measurement, in the same conditions as for the urethane resins. The aqueous solution of the acrylic resin was diluted 20-fold (in terms of volume) with pure water to prepare a sample. The particle size of the sample was determined by dynamic light scattering with a particle size analyzer (trade name "UPA-EX150", manufactured by NIKKISO CO., LTD.) under conditions of a Set-Zero of 30 seconds, a number of measurements of three times, and a measurement time of 180 seconds. As a result, no particle size was determined, and this revealed that the resin was water-soluble.

Preparation of Pigment Dispersion Liquid

Components (unit: parts) shown in Tables 2-1 and 2-2 were mixed to prepare a mixture. The "aqueous resin solution" in Table 2-2 is an aqueous solution of a resin (resin dispersant) used for dispersing a pigment. As the aqueous resin solution, an aqueous solution of an acrylic resin (trade name "Joncryl 683", manufactured by BASF) (content (solid content): 20.0%) was used. The mixture prepared under conditions shown in Table 2-2 was dispersed, and then was centrifuged at a rotation speed of 5,000 rpm for 30 minutes to remove aggregation components. Next, an appropriate amount of ion-exchanged water was added, giving a pigment dispersion liquid.

For the dispersion of a pigment using a media type disperser (expressed as "BM"), a mixture was fed in a media type disperser (trade name "Bead Mill LMZ2", manufactured by Ashizawa Finetech Ltd.) containing zirconia beads at a filling rate of 80% and was treated in a condition of a peripheral speed of 12 m/s. For the dispersion of a pigment using a medialess disperser (expressed as "NM"), a mixture was treated with a high-pressure collision type disperser (trade name "Nanomizer", manufactured by Yoshida Kikai Co., Ltd.) under conditions of a pressure of 150 MPa and a 50-passing. The dispersion using the high-pressure collision type disperser required a time that is about twice the dispersion time of the media type disperser for giving substantially the same pigment dispersion liquid. The contents (%) of the pigments and the resins and the contents of zirconium oxide in terms of zirconium (expressed as "Zr" (unit: ppm)) in the prepared pigment dispersion liquids are shown in Table 2-2. The content of zirconium oxide in terms of zirconium was determined as follows: a prepared pigment dispersion liquid was diluted with ion-exchanged water to prepare a measurement sample; and the measurement sample was subjected to an inductively coupled plasma optical emission spectrometer (trade name "ICP-OES720", manufactured by Agilent Technologies, Inc.). The measurement was performed by a calibration curve method using a zirconium standard stock solution (trade name "ZrO(NO$_3$)$_2$·HNO$_3$ (0.1 mol/L) solution", manufactured by Kanto Chemical Co., Inc.).

TABLE 2-1

Preparation conditions and properties of pigment dispersion liquids

| | | Pigment | |
|---|---|---|---|
| No. | Pigment type | Trade name | |
| 1 | Solid solution | CROMOPHTAL Jet 2BC (manufactured by BASF) | |
| 2 | Solid solution | CROMOPHTAL Jet 2BC (manufactured by BASF) | |
| 3 | Solid solution | CROMOPHTAL Jet 2BC (manufactured by BASF) | |
| 4 | Solid solution | CROMOPHTAL Jet 2BC (manufactured by BASF) | |
| 5 | C.I. Pigment Red 122 | Ink Jet Magenta E 02 (manufactured by BASF) | |
| 6 | C.I. Pigment Red 202 | Cinquasia Magenta D4535 (manufactured by BASF) | |
| 7 | C.I. Pigment Violet 19 | CINQUASIA RED B NRT-796-D (manufactured by BASF) | |
| 8 | C.I. Pigment Blue 15:3 | Hostaperm Blue B2G (manufactured by Clariant) | |
| 9 | C.I. Pigment Green 7 | Heliogen Green D8730 (manufactured by BASF) | |
| 10 | C.I. Pigment Green 36 | Heliogen Green D9360 (manufactured by BASF) | |
| 11 | C.I. Pigment Green 58 | FASTOGEN Green A110 (manufactured by DIC) | |
| 12 | C.I. Pigment Red 254 | IRGAPHOR RED BT-CF (manufactured by BASF) | |
| 13 | C.I. Pigment Red 255 | Cromophtal DPP Coral Red C (manufactured by BASF) | |

TABLE 2-1-continued

Preparation conditions and properties of pigment dispersion liquids

| No. | Pigment type | Trade name |
|---|---|---|
| 14 | C.I. Pigment Red 264 | Irgazin DPP Rubine TR (manufactured by BASF) |
| 15 | C.I. Pigment Red 272 | Cromophtal DPP Flame Red FP (manufactured by BASF) |
| 16 | C.I. Pigment Orange 71 | Cromophtal DPP Orange TR (manufactured by BASF) |
| 17 | C.I. Pigment Violet 23 | Hostaperm Violet P-RL (manufactured by Clariant) |
| 18 | C.I. Pigment Orange 43 | PV Fast Orange GRL (manufactured by Clariant) |
| 19 | C.I. Pigment Red 149 | PV Fast Red B (manufactured by Clariant) |
| 20 | C.I. Pigment Red 177 | FASTOGEN Super Red ATY-TR (manufactured by DIC) |
| 21 | Carbon black | No. 900 (manufactured by Mitsubishi Carbon Black) |
| 22 | C.I. Pigment Yellow 74 | Hansa yellow 5GXB (manufactured by Clariant) |
| 23 | C.I. Pigment Yellow 128 | Cromophtal Yellow D0980J (manufactured by BASF) |
| 24 | C.I. Pigment Yellow 155 | Novoperm Yellow 4G01 (manufactured by Clariant) |
| 25 | C.I. Pigment Yellow 180 | PV Fast Yellow HG (manufactured by Clariant) |
| 26 | C.I. Pigment Yellow 213 | HOSTAPERM Yellow H5G (manufactured by Clariant) |
| 27 | Solid solution | CROMOPHTAL Jet 2BC (manufactured by BASF) |

*Solid solution: a solid solution of C.I. Pigment Red 202 and C.I. Pigment Violet 19

Preparation of Ink

Components (unit: %) shown in the middle part in Table 3 were mixed and thoroughly stirred, and the mixture was subjected to pressure filtration through a cellulose acetate filter with a pore size of 1.2 μm (trade name "Minisart", manufactured by Sartorius) to give the corresponding ink. The polyethylene glycol used had a number-average molecular weight of 1,000. Some of the inks were prepared by using two types of pigment dispersion liquids in order to adjust the content of zirconium. In the lower part in Table 3, the pigment type, the content of zirconium oxide in terms of zirconium (expressed as "Zr", ppm, the measurement conditions are the same as the above) in an ink, the content $C_1$ (%) of the first urethane resin, and the content $C_2$ (%) of the second urethane resin are shown. In the lower part in Table 3, the weight-average molecular weight $Mw_1$ of the first urethane resin and the weight-average molecular weight $Mw_2$ of the second urethane resin are shown. In the lower part in Table 3, the polyol type (expressed as "polyol of first urethane") constituting the first urethane resin and the polyol type (expressed as "polyol of second urethane") constituting the second urethane resin. In the lower part in Table 3, the value $Mw_1/Mw_2$, the value $C_1/C_2$, the acid value $AN_1$ (mg KOH/g) of the first urethane resin, and the acid value $AN_2$ (mg KOH/g) of the second urethane resin are shown. The components used are specifically shown below.

Acetylenol E 100: trade name of a nonionic acetylene glycol surfactant (manufactured by Kawaken Fine Chemicals)

Proxel GXL (S): trade name of an antiseptic agent (manufactured by Arch Chemicals)

The abbreviations of the pigment types in Tables 3-1 to 3-28 are as shown below.

TABLE 2-2

Preparation conditions and properties of pigment dispersion liquids

| | Amount (parts) | | | Dispersion conditions | | | Content | | |
|---|---|---|---|---|---|---|---|---|---|
| No. | Pigment | Aqueous resin solution | Ion-exchanged water | Dispersion apparatus | Bead size (mm) | Dispersion time (hr) | Pigment (%) | Resin (%) | Zr (ppm) |
| 1 | 20.0 | 50.0 | 25.0 | BM | 0.3 | 5 | 20.0 | 10.0 | 25.0 |
| 2 | 10.0 | 25.0 | 60.0 | BM | 0.3 | 10 | 10.0 | 5.0 | 60.0 |
| 3 | 20.0 | 50.0 | 25.0 | BM | 0.1 | 5 | 20.0 | 10.0 | 30.0 |
| 4 | 20.0 | 50.0 | 25.0 | BM | 0.3 | 10 | 20.0 | 10.0 | 55.0 |
| 5 | 20.0 | 50.0 | 25.0 | BM | 0.3 | 5 | 20.0 | 10.0 | 30.0 |
| 6 | 20.0 | 50.0 | 25.0 | BM | 0.3 | 5 | 20.0 | 10.0 | 20.0 |
| 7 | 20.0 | 50.0 | 25.0 | BM | 0.3 | 5 | 20.0 | 10.0 | 21.0 |
| 8 | 20.0 | 50.0 | 25.0 | BM | 0.3 | 5 | 20.0 | 10.0 | 38.0 |
| 9 | 20.0 | 50.0 | 25.0 | BM | 0.3 | 5 | 20.0 | 10.0 | 40.0 |
| 10 | 20.0 | 50.0 | 25.0 | BM | 0.3 | 5 | 20.0 | 10.0 | 44.0 |
| 11 | 20.0 | 50.0 | 25.0 | BM | 0.3 | 5 | 20.0 | 10.0 | 33.0 |
| 12 | 20.0 | 50.0 | 25.0 | BM | 0.3 | 5 | 20.0 | 10.0 | 10.0 |
| 13 | 20.0 | 50.0 | 25.0 | BM | 0.3 | 5 | 20.0 | 10.0 | 14.0 |
| 14 | 20.0 | 50.0 | 25.0 | BM | 0.3 | 5 | 20.0 | 10.0 | 8.0 |
| 15 | 20.0 | 50.0 | 25.0 | BM | 0.3 | 5 | 20.0 | 10.0 | 15.0 |
| 16 | 20.0 | 50.0 | 25.0 | BM | 0.3 | 5 | 20.0 | 10.0 | 17.0 |
| 17 | 20.0 | 50.0 | 25.0 | BM | 0.3 | 5 | 20.0 | 10.0 | 13.0 |
| 18 | 20.0 | 50.0 | 25.0 | BM | 0.3 | 5 | 20.0 | 10.0 | 20.0 |
| 19 | 20.0 | 50.0 | 25.0 | BM | 0.3 | 5 | 20.0 | 10.0 | 24.0 |
| 20 | 20.0 | 50.0 | 25.0 | BM | 0.3 | 5 | 20.0 | 10.0 | 25.0 |
| 21 | 20.0 | 50.0 | 25.0 | BM | 0.3 | 5 | 20.0 | 10.0 | 110.0 |
| 22 | 20.0 | 50.0 | 25.0 | BM | 0.3 | 5 | 20.0 | 10.0 | 10.0 |
| 23 | 20.0 | 50.0 | 25.0 | BM | 0.3 | 5 | 20.0 | 10.0 | 32.0 |
| 24 | 20.0 | 50.0 | 25.0 | BM | 0.3 | 5 | 20.0 | 10.0 | 19.0 |
| 25 | 20.0 | 50.0 | 25.0 | BM | 0.3 | 5 | 20.0 | 10.0 | 29.0 |
| 26 | 20.0 | 50.0 | 25.0 | BM | 0.3 | 5 | 20.0 | 10.0 | 22.0 |
| 27 | 20.0 | 50.0 | 25.0 | NM | — | — | 20.0 | 10.0 | 0.0 |

QA: quinacridone pigment
PC: phthalocyanine pigment
DPP: diketopyrrolopyrrole pigment
DO: dioxazine pigment
PN: perinone pigment PL: perylene pigment
AQ: anthraquinone pigment
CB: carbon black
AZ: azo pigment
QX: quinoxaline pigment

TABLE 3

Formulation and properties of inks

| | \multicolumn{15}{c}{Example} |
| --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 |
| Pigment dispersion liquid number | 1 | 1 + 27 | 2 + 27 | 1 | 1 | 1 | 1 | 1 | 1 | 1 | 1 | 1 | 1 | 1 | 1 |
| First urethane resin number | 1 | 1 | 1 | 3 | 3 | 1 | 5 | 1 | 1 | 14 | 12 | 13 | 15 | 1 | 1 |
| Second urethane resin number | 2 | 2 | 2 | 4 | 2 | 17 | 2 | 8 | 9 | 8 | 17 | 4 | 4 | 20 | 17 |
| Pigment dispersion liquid | 20.00 | 2.00 + 18.00 | 33.30 + 3.40 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of second urethane resin | 4.00 | 4.00 | | 4.00 | 4.00 | 4.00 | 4.00 | 4.00 | 4.00 | 4.00 | 4.00 | 4.00 | 4.00 | 4.00 | 4.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 53.30 | 36.60 | 53.30 | 53.30 | 53.30 | 53.30 | 53.30 | 53.30 | 53.30 | 53.30 | 53.30 | 53.30 | 53.30 | 53.30 |
| Pigment type | QA | QA | QA | QA | QA | QA | QA | QA | QA | QA | QA | QA | QA | QA | QA |
| Zr content (ppm) | 5.0 | 0.5 | 20.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $C_2$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $Mw_1$ | 15,000 | 15,000 | 15,000 | 11,000 | 11,000 | 15,000 | 24,000 | 15,000 | 15,000 | 4,800 | 5,000 | 30,000 | 31,000 | 15,000 | 15,000 |
| $Mw_2$ | 30,000 | 30,000 | 30,000 | 54,000 | 30,000 | 25,000 | 30,000 | 20,000 | 70,000 | 20,000 | 25,000 | 54,000 | 54,000 | 24,000 | 25,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.50 | 0.50 | 0.50 | 0.20 | 0.37 | 0.60 | 0.80 | 0.75 | 0.21 | 0.24 | 0.20 | 0.56 | 0.57 | 0.63 | 0.60 |
| $C_1/C_2$ | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| $AN_1$ (mgKOH/g) | 55 | 55 | 55 | 56 | 56 | 55 | 55 | 55 | 55 | 58 | 53 | 55 | 54 | 55 | 55 |
| $AN_2$ (mgKOH/g) | 55 | 55 | 55 | 54 | 55 | 54 | 55 | 55 | 55 | 55 | 54 | 54 | 54 | 55 | 54 |

| | \multicolumn{15}{c}{Example} |
| --- | --- | --- | --- | --- | --- | --- | --- | --- | --- | --- | --- | --- | --- | --- | --- |
| | 16 | 17 | 18 | 19 | 20 | 21 | 22 | 23 | 24 | 25 | 26 | 27 | 28 | 29 | 30 |
| Pigment dispersion liquid number | 1 | 1 | 1 | 1 | 1 | 1 | 1 | 1 | 1 | 1 | 1 | 1 | 1 | 1 | 1 |
| First urethane resin number | 1 | 1 | 6 | 16 | 18 | 21 | 1 | 1 | 1 | 1 | 1 | 1 | 1 | 1 | 1 |
| Second urethane resin number | 19 | 22 | 2 | 2 | 2 | 2 | 33 | 2 | 2 | 2 | 2 | 2 | 2 | 2 | 2 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 4.00 | 4.00 | 4.00 | 4.00 | 4.00 | 4.00 | 4.00 | 4.00 | 0.20 | 20.00 | 21.00 |
| Aqueous solution of second urethane resin | 4.00 | 4.00 | 4.00 | 4.00 | 4.00 | 4.00 | 4.00 | 4.00 | 0.20 | 20.00 | 21.00 | 0.10 | 4.00 | 4.00 | 4.00 |

TABLE 3-continued

Formulation and properties of inks

| | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|
| urethane resin Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 55.30 | 53.30 | 53.30 | 53.30 | 53.30 | 53.30 | 57.20 | 57.10 | 37.30 | 36.30 | 57.10 | 57.10 | 37.30 | 36.30 |
| Pigment type | QA | QA | QA | QA | QA | QA | QA | QA | PC | PC | PC | PC | DPP | DPP | DPP |
| Zr content (ppm) | 5.0 | 5.0 | 6.0 | 11.0 | 5.0 | 6.0 | 4.0 | 4.2 | 7.6 | 8.0 | 8.8 | 6.6 | 2.0 | 2.8 | 1.6 |
| $C_1$ (%) | 0.18 | 0.40 | 0.40 | 0.40 | 0.40 | 0.40 | 0.40 | 0.40 | 0.40 | 0.40 | 0.40 | 0.01 | 0.02 | 2.00 | 2.10 |
| $C_2$ (%) | 0.40 | 0.20 | 0.40 | 0.40 | 0.40 | 0.40 | 0.40 | 0.01 | 0.02 | 2.00 | 2.10 | 0.40 | 0.40 | 0.40 | 0.40 |
| $Mw_1$ | 15,000 | 15,000 | 9,500 | 10,000 | 20,000 | 21,000 | 15,000 | 15,000 | 15,000 | 15,000 | 15,000 | 15,000 | 15,000 | 15,000 | 15,000 |
| $Mw_2$ | 60,000 | 62,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PEG | PTMG | PTMG | PTMG | PTMG | PTMG | PTMG | PTMG | PTMG |
| $Mw_1/Mw_2$ | 0.25 | 0.24 | 0.32 | 0.33 | 0.67 | 0.70 | 0.50 | 0.50 | 0.50 | 0.50 | 0.50 | 0.50 | 0.50 | 0.50 | 0.50 |
| $C_1/C_2$ | 1.00 | 1.00 | 1.00 | 1.00 | 1.00 | 1.00 | 1.00 | 40.00 | 20.00 | 0.20 | 0.19 | 0.03 | 0.05 | 5.00 | 5.25 |
| $AN_1$ (mgKOH/g) | 55 | 55 | 58 | 51 | 54 | 58 | 55 | 55 | 55 | 55 | 55 | 55 | 55 | 55 | 55 |
| $AN_2$ (mgKOH/g) | 55 | 56 | 55 | 55 | 55 | 55 | 55 | 55 | 55 | 55 | 55 | 55 | 55 | 55 | 55 |

Example

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Pigment dispersion liquid number | 1 | 1 | 3 | 4 | 2 + 27 | 5 | 6 | 7 | 8 | 9 | 10 | 11 | 12 | 13 | 14 |
| First urethane resin number | 1 | 1 | 1 | 1 | 1 | 1 | 1 | 1 | 1 | 1 | 1 | 1 | 1 | 1 | 1 |
| Second urethane resin number | 2 | 2 | 2 | 2 | 2 | 2 | 2 | 2 | 2 | 2 | 2 | 2 | 2 | 2 | 2 |
| Pigment dispersion liquid | 20.00 | 20.00 | 20.00 | 20.00 | 8.30 + 15.90 | 20.00 | 20.00 | 20.00 | 20.00 | 20.00 | 20.00 | 20.00 | 20.00 | 20.00 | 20.00 |
| Aqueous solution of first urethane resin | 1.80 | 2.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of second urethane resin | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 55.50 | 55.30 | 53.30 | 53.30 | 49.10 | 53.30 | 53.30 | 53.30 | 53.30 | 53.30 | 53.30 | 53.30 | 53.30 | 53.30 | 53.30 |
| Pigment type | QA | QA | QA | QA | QA | QA | QA | QA | PC | PC | PC | PC | DPP | DPP | DPP |
| Zr content (ppm) | 5.0 | 5.0 | 6.0 | 11.0 | 5.0 | 6.0 | 4.0 | 4.2 | 7.6 | 8.0 | 8.8 | 6.6 | 2.0 | 2.8 | 1.6 |
| $C_1$ (%) | 0.18 | 0.40 | 0.40 | 0.40 | 0.40 | 0.40 | 0.40 | 0.40 | 0.40 | 0.40 | 0.40 | 0.40 | 0.40 | 0.40 | 0.40 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 15,000 | 15,000 |

TABLE 3-continued

Formulation and properties of inks

Example

| | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|
| $Mw_2$ | 30,000 | 30,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| $C_1/C_2$ | 0.45 | 0.50 | 1.00 | 1.00 | 1.00 | 1.00 | 1.00 | 1.00 | 1.00 | 1.00 | 1.00 | 1.00 | 1.00 | 1.00 | 1.00 |
| $AN_1$ (mgKOH/g) | 55 | 55 | 55 | 55 | 55 | 55 | 55 | 55 | 55 | 55 | 55 | 55 | 55 | 55 | 55 |
| $AN_2$ (mgKOH/g) | 55 | 55 | 55 | 55 | 55 | 55 | 55 | 55 | 55 | 55 | 55 | 55 | 55 | 55 | 55 |
| Pigment dispersion liquid number | 15 | 16 | 17 | 18 | 19 | 20 | 1 | 1 | 1 | 1 | 1 | 1 | 1 | 1 | 1 |
| First urethane resin number | 1 | 1 | 1 | 1 | 1 | 1 | 1 | 1 | 1 | 1 | 1 | 1 | 1 | 10 | 37 |
| Second urethane resin number | 2 | 2 | 2 | 2 | 2 | 2 | 31 | 32 | 13 | 2 | 31 | 32 | 13 | 33 | 2 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of second urethane resin | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 53.30 | 53.30 | 53.30 | 53.30 | 53.30 | 53.30 | 53.30 | 53.30 | 53.30 | 53.30 | 53.30 | 53.30 | 53.30 | 53.30 |
| Pigment type | DPP | DPP | DO | PN | PL | AQ | QA | QA | QA | QA | QA | QA | QA | QA | QA |
| Zr content (ppm) | 3.0 | 3.4 | 2.6 | 4.0 | 4.8 | 5.0 | 5.0 | 5.0 | 5.0 | 5.0 | 5.0 | 5.0 | 5.0 | 5.0 | 5.0 |
| $C_1$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $C_2$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $Mw_1$ | 15,000 | 15,000 | 15,000 | 15,000 | 15,000 | 15,000 | 15,000 | 15,000 | 15,000 | 15,000 | 19,000 | 19,000 | 19,000 | 19,000 | 15,000 |
| $Mw_2$ | 30,000 | 30,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PTMG | PTMG | PTMG | PTMG | PPG |
| Polyol of second urethane | PTMG | PTMG | PTMG | PTMG | PTMG | PTMG | PTMG | PTMG | PPG | PTMG | PTMG | PTMG | PPG | PEG | PTMG |
| $Mw_1/Mw_2$ | 0.50 | 0.50 | 0.50 | 0.50 | 0.50 | 0.50 | 0.50 | 0.50 | 0.50 | 0.50 | 0.63 | 0.63 | 0.63 | 0.63 | 0.50 |
| $C_1/C_2$ | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| $AN_1$ (mgKOH/g) | 55 | 55 | 55 | 55 | 55 | 55 | 55 | 55 | 55 | 55 | 55 | 55 | 55 | 55 | 53 |
| $AN_2$ (mgKOH/g) | 55 | 55 | 55 | 55 | 55 | 55 | 55 | 54 | 55 | 55 | 55 | 54 | 55 | 55 | 55 |

Example

| | 61 | 62 | 63 | 64 | 65 | 66 | 67 | 68 | 69 | 70 | 71 | 72 | 73 | 74 | 75 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 |
| First urethane resin number | 37 | 37 | 37 | 37 | 38 | 38 | 38 | 38 | 38 | 39 | 39 | 39 | 39 | 39 | 1 |

TABLE 3-continued

Formulation and properties of inks

| | | | | | | | | | | | | | | |
|---|---|---|---|---|---|---|---|---|---|---|---|---|---|---|
| Second urethane resin number | 31 | 32 | 13 | 33 | 31 | 32 | 31 | 2 | 32 | 13 | 32 | 13 | 33 | 43 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of second urethane resin | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of acrylic resin | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 53.30 | 53.30 | 53.30 | 53.30 | 53.30 | 53.30 | 53.30 | 53.30 | 53.30 | 53.30 | 53.30 | 53.30 | 53.30 |
| Pigment type | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.40 | 0.40 | 0.40 | 0.40 | 0.40 | 0.40 | 0.40 | 0.40 | 0.40 | 0.40 | 0.40 | 0.40 | 0.40 | 0.40 |
| $C_2$ (%) | 0.40 | 0.40 | 0.40 | 0.40 | 0.40 | 0.40 | 0.40 | 0.40 | 0.40 | 0.40 | 0.40 | 0.40 | 0.40 | 0.40 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 15,000 |
| $Mw_2$ | 30,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PTMG | PTMG | PTMG | PEG | PEG | PEG | PEG | PEG | PEG | PPG |
| Polyol of second urethane | PPG | PTMG | PPG | PEG | PTMG | PPG | PTMG | PTMG | PTMG | PPG | PTMG | PPG | PEG | PTMG |
| $Mw_1/Mw_2$ | 0.50 | 0.50 | 0.50 | 0.50 | 0.50 | 0.50 | 0.50 | 0.50 | 0.50 | 0.50 | 0.50 | 0.50 | 0.50 | 0.50 |
| $C_1/C_2$ | 1.00 | 1.00 | 1.00 | 1.00 | 1.00 | 1.00 | 1.00 | 1.00 | 1.00 | 1.00 | 1.00 | 1.00 | 1.00 | 1.00 |
| $AN_1$ (mgKOH/g) | 53 | 53 | 53 | 53 | 56 | 56 | 56 | 56 | 56 | 55 | 55 | 55 | 55 | 55 |
| $AN_2$ (mgKOH/g) | 55 | 54 | 55 | 55 | 55 | 55 | 54 | 55 | 54 | 55 | 55 | 55 | 55 | 58 |

Example

| | 76 | 77 | 78 | 79 | 80 | 81 | 82 | 83 | 84 | 85 | 86 | 87 | 88 | 89 | 90 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 |
| First urethane resin number | 44 | 45 | 46 | 47 | 48 | 49 | 50 | 51 | 52 | 53 | 54 | 55 | 56 | 57 | 58 |
| Second urethane resin number | | | | | | | | | | | 2 | 2 | 2 | 2 | 2 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| Aqueous solution of second urethane resin | | | | | | | | | | | 4.00 | 4.00 | 4.00 | 4.00 | 4.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |

TABLE 3-continued

Formulation and properties of inks

| | 91 | 92 | 93 | 94 | 95 | 96 | 97 | 98 | 99 | 100 | 101 | 102 | 103 | 104 | 105 |
|---|---|---|---|---|---|---|---|---|---|---|---|---|---|---|---|
| Ion-exchanged water | 53.30 | 53.30 | 53.30 | 53.30 | 53.30 | 53.30 | 53.30 | 53.30 | 53.30 | 53.30 | 53.30 | 53.30 | 53.30 | 53.30 | 53.30 |
| Pigment type | QA | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $C_2$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 15,000 | 15,000 |
| $Mw_2$ | 30,000 | 30,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| $C_1/C_2$ | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| $AN_1$ (mgKOH/g) | 55 | 59 | 57 | 56 | 55 | 55 | 55 | 55 | 55 | 55 | 58 | 56 | 55 | 55 | 58 |
| $AN_2$ (mgKOH/g) | 56 | 55 | 55 | 55 | 55 | 58 | 57 | 54 | 55 | 57 | 55 | 55 | 55 | 55 | 55 |

Example

| | 91 | 92 | 93 | 94 | 95 | 96 | 97 | 98 | 99 | 100 | 101 | 102 | 103 | 104 | 105 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 |
| First urethane resin number | 59 | 60 | 61 | 62 | 63 | 64 | 1 | 1 | 1 | 1 | 1 | 1 | 1 | 1 | 1 |
| Second urethane resin number | 2 | 2 | 2 | 2 | 2 | 2 | 2 | 2 | 2 | 2 | 2 | 2 | 2 | 2 | 2 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 4.00 | 4.00 | 0.20 | 1.00 | 2.00 | 8.00 | 20.00 | 0.10 | 0.20 | 1.00 | 2.00 |
| Aqueous solution of second urethane resin | 4.00 | 4.00 | 4.00 | 4.00 | 4.00 | 4.00 | 0.10 | 0.10 | 0.10 | 0.10 | 0.10 | 0.20 | 0.20 | 0.20 | 0.20 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 53.30 | 53.30 | 53.30 | 53.30 | 53.30 | 61.00 | 60.20 | 59.20 | 53.20 | 41.20 | 41.00 | 60.90 | 60.10 | 59.10 |
| Pigment type | QA | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.40 | 0.40 | 0.40 | 0.40 | 0.40 | 0.40 | 0.02 | 0.10 | 0.20 | 0.80 | 2.00 | 0.01 | 0.02 | 0.10 | 0.20 |
| $C_2$ (%) | 0.40 | 0.40 | 0.40 | 0.40 | 0.40 | 0.40 | 0.01 | 0.01 | 0.01 | 0.01 | 0.01 | 0.02 | 0.02 | 0.02 | 0.02 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 15,000 | 15,000 |
| $Mw_2$ | 30,000 | 30,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| $C_1/C_2$ | 1.00 | 1.00 | 1.00 | 1.00 | 1.00 | 1.00 | 2.00 | 10.00 | 20.00 | 80.00 | 200.0 | 0.50 | 1.00 | 5.00 | 10.00 |
| $AN_1$ (mgKOH/g) | 55 | 55 | 55 | 56 | 55 | 55 | 55 | 55 | 55 | 55 | 55 | 55 | 55 | 55 | 55 |
| $AN_2$ (mgKOH/g) | 55 | 55 | 55 | 55 | 55 | 55 | 55 | 55 | 55 | 55 | 55 | 55 | 55 | 55 | 55 |

Example

TABLE 3-continued

Formulation and properties of inks

| | 106 | 107 | 108 | 109 | 110 | 111 | 112 | 113 | 114 | 115 | 116 | 117 | 118 | 119 | 120 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 |
| First urethane resin number | 1 | 1 | 1 | 1 | 1 | 1 | 1 | 1 | 1 | 1 | 1 | 1 | 1 | 1 | 1 |
| Second urethane resin number | 2 | 2 | 2 | 2 | 2 | 2 | 2 | 2 | 2 | 2 | 2 | 2 | 2 | 2 | 2 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 8.00 | 20.00 | 21.00 | 0.10 | 0.45 | 0.50 | 1.00 | 2.00 | 4.00 | 0.10 | 0.20 | 0.90 | 1.00 | 2.00 | 4.00 |
| Aqueous solution of second urethane resin | 0.20 | 0.20 | 0.20 | 1.00 | 1.00 | 1.00 | 1.00 | 1.00 | 1.00 | 2.00 | 2.00 | 2.00 | 2.00 | 2.00 | 2.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.10 | 41.10 | 40.10 | 60.20 | 59.85 | 59.80 | 59.30 | 58.30 | 56.30 | 59.20 | 59.10 | 58.40 | 58.30 | 57.30 | 55.30 |
| Pigment type | QA | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.80 | 2.00 | 2.10 | 0.01 | 0.045 | 0.05 | 0.10 | 0.20 | 0.40 | 0.01 | 0.02 | 0.09 | 0.10 | 0.20 | 0.40 |
| $C_2$ (%) | 0.02 | 0.02 | 0.02 | 0.10 | 0.10 | 0.10 | 0.10 | 0.10 | 0.10 | 0.20 | 0.20 | 0.20 | 0.20 | 0.20 | 0.20 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 15,000 | 15,000 |
| $Mw_2$ | 30,000 | 30,000 | 30,000 | 30,000 | 30,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| $C_1/C_2$ | 40.00 | 100.00 | 105.00 | 0.10 | 0.45 | 0.50 | 1.00 | 2.00 | 4.00 | 0.05 | 0.10 | 0.45 | 0.50 | 1.00 | 2.00 |
| $AN_1$ (mgKOH/g) | 55 | 55 | 55 | 55 | 55 | 55 | 55 | 55 | 55 | 55 | 55 | 55 | 55 | 55 | 55 |
| $AN_2$ (mgKOH/g) | 55 | 55 | 55 | 55 | 55 | 55 | 55 | 55 | 55 | 55 | 55 | 55 | 55 | 55 | 55 |

Example

| | 121 | 122 | 123 | 124 | 125 | 126 | 127 | 128 | 129 | 130 | 131 | 132 | 133 | 134 | 135 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 |
| First urethane resin number | 1 | 1 | 1 | 1 | 1 | 1 | 1 | 1 | 1 | 1 | 1 | 3 | 3 | 3 | 3 |
| Second urethane resin number | 2 | 2 | 2 | 2 | 2 | 2 | 2 | 2 | 2 | 2 | 2 | 4 | 4 | 4 | 4 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 0.10 | 0.20 | 3.50 | 4.00 | 8.00 | 0.10 | 0.20 | 20.00 | 21.00 | 0.20 | 20.00 | 0.20 | 20.00 | 20.00 | 20.00 |

TABLE 3-continued

Formulation and properties of inks

| | Example 136 | 137 | 138 | 139 | 140 | 141 | 142 | 143 | 144 | 145 | 146 | 147 | 148 | 149 | 150 |
|---|---|---|---|---|---|---|---|---|---|---|---|---|---|---|---|
| Aqueous solution of second urethane resin | 8.00 | 8.00 | 8.00 | 8.00 | 8.00 | 20.00 | 20.00 | 20.00 | 20.00 | 21.00 | 21.00 | 0.20 | 20.00 | 0.20 | 20.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.20 | 53.10 | 49.80 | 49.30 | 45.30 | 41.10 | 41.10 | 21.30 | 20.30 | 40.10 | 20.30 | 60.90 | 41.10 | 41.10 | 21.30 |
| Pigment type | QA | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.01 | 0.02 | 0.35 | 0.40 | 0.80 | 0.01 | 0.02 | 2.00 | 2.10 | 0.02 | 2.00 | 0.02 | 0.02 | 0.02 | 2.00 |
| $C_2$ (%) | 0.80 | 0.80 | 0.80 | 0.80 | 0.80 | 2.00 | 2.00 | 2.00 | 2.00 | 2.10 | 2.10 | 0.02 | 2.00 | 0.02 | 2.00 |
| $Mw_1$ | 15,000 | 15,000 | 15,000 | 15,000 | 15,000 | 15,000 | 15,000 | 15,000 | 15,000 | 15,000 | 15,000 | 11,000 | 11,000 | 11,000 | 11,000 |
| $Mw_2$ | 30,000 | 30,000 | 30,000 | 30,000 | 30,000 | 30,000 | 30,000 | 30,000 | 30,000 | 30,000 | 30,000 | 54,000 | 54,000 | 54,000 | 54,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.50 | 0.50 | 0.50 | 0.50 | 0.50 | 0.50 | 0.50 | 0.50 | 0.50 | 0.50 | 0.50 | 0.20 | 0.20 | 0.20 | 0.20 |
| $C_1/C_2$ | 0.01 | 0.03 | 0.44 | 0.50 | 1.00 | 0.01 | 0.01 | 1.00 | 1.05 | 0.01 | 0.95 | 1.00 | 0.01 | 100.00 | 1.00 |
| $AN_1$ (mgKOH/g) | 55 | 55 | 55 | 55 | 55 | 55 | 55 | 55 | 55 | 55 | 55 | 56 | 56 | 56 | 56 |
| $AN_2$ (mgKOH/g) | 55 | 55 | 55 | 55 | 55 | 55 | 55 | 55 | 55 | 55 | 55 | 54 | 54 | 54 | 54 |

| | Example 136 | 137 | 138 | 139 | 140 | 141 | 142 | 143 | 144 | 145 | 146 | 147 | 148 | 149 | 150 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 |
| First urethane resin number | 3 | 3 | 3 | 3 | 1 | 1 | 1 | 1 | 5 | 5 | 5 | 5 | 1 | 1 | 1 |
| Second urethane resin number | 2 | 2 | 2 | 2 | 17 | 17 | 17 | 17 | 2 | 2 | 2 | 2 | 31 | 31 | 31 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 0.20 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of second urethane resin | 0.20 | | | | | | | | | | | 0.20 | 0.20 | 0.20 | 0.20 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 60.90 | 41.10 | 41.10 | 21.30 | 60.90 | 41.10 | 41.10 | 21.30 | 60.90 | 41.10 | 41.10 | 21.30 | 60.90 | 41.10 | 41.10 |
| Pigment type | QA | QA | QA | QA | QA | QA | QA | QA | QA | QA | QA | QA | QA | QA | QA |
| $C_1$ (%) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_2$ (%) | 0.02 | 0.02 | 0.02 | 0.02 | 0.02 | 0.02 | 0.02 | 0.02 | 0.02 | 0.02 | 0.02 | 2.00 | 0.02 | 2.00 | 2.00 |
| | 0.02 | 0.02 | 0.02 | 0.02 | 0.02 | 0.02 | 0.02 | 0.02 | 0.02 | 0.02 | 0.02 | 2.00 | 0.02 | 2.00 | 0.02 |

TABLE 3-continued

Formulation and properties of inks

Examples 151–165:

| Parameter | 151 | 152 | 153 | 154 | 155 | 156 | 157 | 158 | 159 | 160 | 161 | 162 | 163 | 164 | 165 |
|---|---|---|---|---|---|---|---|---|---|---|---|---|---|---|---|
| $Mw_1$ | 11,000 | 11,000 | 11,000 | 11,000 | 15,000 | 15,000 | 15,000 | 15,000 | 24,000 | 24,000 | 24,000 | 24,000 | 15,000 | 15,000 | 15,000 |
| $Mw_2$ | 30,000 | 30,000 | 30,000 | 30,000 | 25,000 | 25,000 | 25,000 | 25,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PTMG | PTMG | PTMG | PTMG | PTMG | PTMG | PTMG | PTMG | PTMG | PTMG | PTMG | PTMG | PTMG | PTMG | PTMG |
| $Mw_1/Mw_2$ | 0.37 | 0.37 | 0.37 | 0.37 | 0.60 | 0.60 | 0.60 | 0.60 | 0.80 | 0.80 | 0.80 | 0.80 | 0.50 | 0.50 | 0.50 |
| $C_1/C_2$ | 1.00 | 0.01 | 100.00 | 1.00 | 1.00 | 0.01 | 100.00 | 1.00 | 1.00 | 0.01 | 100.00 | 1.00 | 1.00 | 0.01 | 100.00 |
| $AN_1$ (mgKOH/g) | 56 | 56 | 56 | 56 | 55 | 55 | 54 | 54 | 55 | 55 | 55 | 55 | 55 | 55 | 55 |
| $AN_2$ (mgKOH/g) | 55 | 55 | 55 | 55 | 54 | 54 | 55 | 55 | 55 | 55 | 55 | 55 | 55 | 55 | 55 |
| Pigment dispersion liquid number | 1 | 1 | 1 | 1 | 1 | 3 | 3 | 3 | 3 | 3 | 3 | 3 | 1 | 1 | 1 |
| First urethane resin number | 1 | 3 | 3 | 3 | 3 | 65 | 31 | 31 | 31 | 31 | 31 | 66 | 66 | 66 | 66 |
| Second urethane resin number | 31 | 65 | 65 | 65 | 65 | 65 | 31 | 31 | 31 | 31 | 31 | 66 | 66 | 66 | 66 |
| Pigment dispersion liquid | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Aqueous solution of first urethane resin | 20.00 | 4.00 | 0.20 | 0.20 | 20.00 | 20.00 | 4.00 | 0.20 | 0.20 | 0.20 | 20.00 | 4.00 | 0.20 | 20.00 | 20.00 |
| Aqueous solution of second urethane resin | 20.00 | 4.00 | 0.20 | 20.00 | 20.00 | 20.00 | 4.00 | 0.20 | 20.00 | 20.00 | 20.00 | 4.00 | 0.20 | 20.00 | 0.20 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 21.30 | 53.30 | 60.90 | 41.10 | 41.10 | 21.30 | 53.30 | 60.90 | 41.10 | 41.10 | 21.30 | 53.30 | 60.90 | 41.10 | 41.10 |
| Pigment type | QA | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 2.00 | 0.40 | 0.02 | 0.02 | 2.00 | 2.00 | 0.40 | 0.02 | 0.02 | 0.02 | 2.00 | 0.40 | 0.02 | 2.00 | 2.00 |
| $C_2$ (%) | 2.00 | 0.40 | 0.02 | 2.00 | 2.00 | 2.00 | 0.40 | 0.02 | 2.00 | 2.00 | 2.00 | 0.40 | 0.02 | 2.00 | 0.02 |
| $Mw_1$ | 15,000 | 11,000 | 11,000 | 11,000 | 11,000 | 11,000 | 15,000 | 15,000 | 24,000 | 11,000 | 11,000 | 15,000 | 15,000 | 15,000 | 15,000 |
| $Mw_2$ | 30,000 | 30,000 | 30,000 | 30,000 | 54,000 | 54,000 | 25,000 | 25,000 | 30,000 | 30,000 | 30,000 | 25,000 | 25,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PPG | PPG | PPG | PPG | PPG | PPG | PPG | PPG | PPG | PPG | PPG | PPG | PPG | PPG | PPG |
| $Mw_1/Mw_2$ | 0.50 | 0.37 | 0.37 | 0.37 | 0.20 | 0.20 | 0.60 | 0.60 | 0.37 | 0.37 | 0.37 | 0.60 | 0.60 | 0.60 | 0.60 |
| $C_1/C_2$ | 1.00 | 1.00 | 1.00 | 1.00 | 100.00 | 1.00 | 1.00 | 1.00 | 1.00 | 100.00 | 100.00 | 0.60 | 1.00 | 0.01 | 100.00 |
| $AN_1$ (mgKOH/g) | 55 | 56 | 56 | 56 | 56 | 56 | 56 | 56 | 56 | 56 | 55 | 55 | 55 | 55 | 55 |
| $AN_2$ (mgKOH/g) | 55 | 55 | 55 | 54 | 54 | 54 | 55 | 55 | 55 | 55 | 55 | 55 | 55 | 55 | 55 |

Examples 166–181:

| Parameter | 166 | 167 | 168 | 169 | 170 | 171 | 172 | 173 | 174 | 175 | 176 | 177 | 178 | 179 | 180 | 181 |
|---|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 1 | 1 | 1 |

TABLE 3-continued

Formulation and properties of inks

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| First urethane resin number | 1 | 5 | 5 | 5 | 5 | 5 | 1 | 1 | 1 | 1 | 1 | 1 | 1 | 1 | 1 |
| Second urethane resin number | 66 | 31 | 31 | 31 | 31 | 31 | 2 | 28 | 24 | 26 | 30 | 27 | 23 | 25 | 29 |
| Pigment dispersion liquid | 20.00 | 20.00 | 20.00 | 20.00 | 20.00 | 20.00 | 5.00 | 40.00 | 20.00 | 20.00 | 20.00 | 20.00 | 20.00 | 20.00 | 20.00 |
| Aqueous solution of first urethane resin | 20.00 | 0.20 | 0.20 | 0.20 | 20.00 | 20.00 | 4.00 | 4.00 | 4.00 | 4.00 | 4.00 | 4.00 | 4.00 | 4.00 | 4.00 |
| Aqueous solution of second urethane resin | 20.00 | 4.00 | 20.00 | 20.00 | 20.00 | 20.00 | 4.00 | 4.00 | 4.00 | 4.00 | 4.00 | 4.00 | 4.00 | 4.00 | 4.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 21.30 | 60.90 | 41.10 | 41.10 | 21.30 | 68.30 | 33.30 | 53.30 | 53.30 | 53.30 | 53.30 | 53.30 | 53.30 | 53.30 | 53.30 |
| Pigment type | QA | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 2.00 | 0.02 | 0.02 | 0.02 | 2.00 | 0.40 | 0.40 | 0.40 | 0.40 | 0.40 | 0.40 | 0.40 | 0.40 | 0.40 | 0.40 |
| $C_2$ (%) | 2.00 | 0.02 | 0.02 | 0.02 | 2.00 | 0.40 | 0.40 | 0.40 | 0.40 | 0.40 | 0.40 | 0.40 | 0.40 | 0.40 | 0.40 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 15,000 | 15,000 |
| $Mw_2$ | 25,000 | 24,000 | 24,000 | 24,000 | 24,000 | 30,000 | 30,000 | 30,000 | 30,000 | 30,000 | 30,000 | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PPG | PPG |
| Polyol of second urethane | PPG | PPG | PPG | PPG | PPG | PPG | PTMG | PTMG | PTMG | PTMG | PTMG | PTMG | PTMG | PTMG | PTMG |
| $Mw_1/Mw_2$ | 0.60 | 0.80 | 0.80 | 0.80 | 0.80 | 0.50 | 0.50 | 0.50 | 0.50 | 0.50 | 0.50 | 0.50 | 0.50 | 0.50 | 0.50 |
| $C_1/C_2$ | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| $AN_1$ (mgKOH/g) | 55 | 55 | 55 | 55 | 55 | 55 | 55 | 55 | 55 | 55 | 55 | 55 | 55 | 55 | 55 |
| $AN_2$ (mgKOH/g) | 56 | 55 | 55 | 55 | 55 | 55 | 55 | 29 | 30 | 55 | 55 | 29 | 30 | 100 | 105 |

Comparative Example

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Pigment dispersion liquid number | 2 + 27 | 1 | 1 | 1 | 1 | 1 | 1 | 1 | 1 + 27 | 1 | 1 | 1 | 1 | 1 | 1 |
| First urethane resin number | 2 | 1 | 2 | 34 | 6 | 7 | 10 | 11 | — | — | 5 | 6 | 7 | 8 | 9 |
| Second urethane resin number | — | — | — | — | — | 2 | — | — | — | — | — | — | — | — | — |
| Pigment dispersion liquid | 35.00 + 2.50 | 20.00 | 20.00 | 20.00 | 20.00 | 20.00 | 20.00 | 20.00 | 2.00 + 18.00 | 20.00 | 20.00 | 20.00 | 20.00 | 20.00 | 20.00 |
| Aqueous solution of first urethane resin | 4.00 | 4.00 | | 4.00 | 4.00 | 4.00 | 4.00 | 4.00 | | | 4.00 | 4.00 | 4.00 | 4.00 | 4.00 |
| Aqueous solution of second urethane resin | 4.00 | | 4.00 | | | | | | | | | | | | |
| Aqueous solution of acrylic resin | | | | | | | | | | 5.00 | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |

TABLE 3-continued

Formulation and properties of inks

| | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Proxel GXL (5) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 35.80 | 57.30 | 57.30 | 53.30 | 53.30 | 53.30 | 53.30 | 53.30 | 61.30 | 56.30 | 57.30 | 57.30 | 57.30 | 57.30 | 57.30 |
| Pigment type | QA | QA | QA | QA | QA | QA | QA | QA | QA | QA | QA | QA | QA | QA | PC |
| Zr content (ppm) | 21.0 | 5.0 | 5.0 | 5.0 | 5.0 | 5.0 | 5.0 | 5.0 | 0.5 | 5.0 | 6.0 | 4.0 | 4.2 | 7.6 | 8.0 |
| $C_1$ (%) | 0.40 | 0.40 | 0.00 | 0.40 | 0.40 | 0.40 | 0.40 | 0.40 | 0.00 | 0.00 | 0.40 | 0.40 | 0.40 | 0.40 | 0.40 |
| $C_2$ (%) | 0.40 | 0.00 | 0.40 | 0.40 | 0.40 | 0.40 | 0.40 | 0.40 | 0.00 | 0.00 | 0.00 | 0.00 | 0.00 | 0.00 | 0.00 |
| $Mw_1$ | 15,000 | 15,000 | — | 15,000 | 9,500 | 25,000 | 15,000 | 15,000 | — | — | — | 15,000 | 15,000 | 15,000 | 15,000 |
| $Mw_2$ | 30,000 | — | 30,000 | 30,000 | 54,000 | 30,000 | 19,000 | 72,000 | — | — | 15,000 | — | — | — | — |
| Polyol of first urethane | PPG | PPG | — | PPG | PPG | PPG | PPG | PPG | — | — | — | PPG | PPG | PPG | PPG |
| Polyol of second urethane | PTMG | — | PTMG | PHMCD | PTMG | PTMG | PTMG | PTMG | — | — | PPG | — | — | — | — |
| $Mw_1/Mw_2$ | 0.50 | — | — | 0.50 | 0.18 | 0.83 | 0.79 | 0.21 | — | — | — | — | — | — | — |
| $C_1/C_2$ | 1.00 | — | 0.00 | 1.00 | 1.00 | 1.00 | 1.00 | 1.00 | — | — | — | — | — | — | — |
| $AN_1$ (mgKOH/g) | 55 | 55 | — | 55 | 58 | 56 | 55 | 55 | — | — | — | 55 | 55 | 55 | 55 |
| $AN_2$ (mgKOH/g) | 55 | — | 55 | 56 | 54 | 55 | 55 | 54 | — | — | 55 | — | — | — | — |

| | Comparative Example | | | | | | | | | | | | | | |
|---|---|---|---|---|---|---|---|---|---|---|---|---|---|---|---|
| | 10 | 11 | 12 | 13 | 14 | 15 | 16 | 17 | 18 | 19 | 20 | 35 | 36 | 34 | 35 |

| | 10 | 11 | 12 | 13 | 14 | 15 | 16 | 17 | 18 | 19 | 20 | 1 | 1 | 10 | 10 |
|---|---|---|---|---|---|---|---|---|---|---|---|---|---|---|---|
| Pigment dispersion liquid number | 1 | 1 | 1 | 1 | 1 | 1 | 1 | 1 | 1 | 1 | 1 | 1 | 1 | 10 | 10 |
| First urethane resin number | — | 20.00 | — | — | — | — | — | — | — | — | — | 35 | 36 | 34 | 35 |
| Second urethane resin number | 20.00 | 4.00 | 20.00 | 20.00 | 20.00 | 20.00 | 20.00 | 20.00 | 20.00 | 20.00 | 20.00 | 20.00 | 20.00 | 20.00 | 20.00 |
| Pigment dispersion liquid | 4.00 | | 4.00 | 4.00 | 4.00 | 4.00 | 4.00 | 4.00 | 4.00 | 4.00 | 4.00 | 4.00 | 4.00 | 4.00 | 4.00 |
| Aqueous solution of first urethane resin | | | | | | | | | | | | | | | |
| Aqueous solution of second urethane resin | | | | | | | | | | | | 4.00 | 4.00 | 4.00 | 4.00 |
| Aqueous solution of acrylic resin | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 57.30 | 57.30 | 57.30 | 57.30 | 57.30 | 57.30 | 57.30 | 57.30 | 57.30 | 57.30 | 57.30 | 53.30 | 53.30 | 53.30 | 53.30 |
| Pigment type | PC | PC | DPP | DPP | DPP | DPP | DPP | DO | PN | PL | AQ | QA | QA | QA | QA |
| Zr content (ppm) | 8.8 | 6.6 | 2.0 | 2.8 | 1.6 | 3.0 | 3.4 | 2.6 | 4.0 | 4.8 | 5.0 | 5.0 | 5.0 | 5.0 | 5.0 |
| $C_1$ (%) | 0.40 | 0.40 | 0.40 | 0.40 | 0.40 | 0.40 | 0.40 | 0.40 | 0.40 | 0.40 | 0.40 | 0.40 | 0.40 | 0.40 | 0.40 |
| $C_2$ (%) | 0.00 | 0.00 | 0.00 | 0.00 | 0.00 | 0.00 | 0.00 | 0.00 | 0.00 | 0.00 | 0.00 | 0.40 | 0.40 | 0.40 | 0.40 |
| $Mw_1$ | 15,000 | 15,000 | 15,000 | 15,000 | 15,000 | 15,000 | 15,000 | 15,000 | 15,000 | 15,000 | 15,000 | 15,000 | 15,000 | 19,000 | 19,000 |
| $Mw_2$ | — | — | — | — | — | — | — | — | — | — | — | 30,000 | 30,000 | 30,000 | 30,000 |
| Polyol of first urethane | PPG | PPG | PPG | PPG | PPG | PPG | PPG | PPG | PPG | PPG | PPG | PPG | PPG | PTMG | PTMG |
| Polyol of second urethane | — | — | — | — | — | — | — | — | — | — | — | PEA | PBA | PCD | PEA |
| $Mw_1/Mw_2$ | — | — | — | — | — | — | — | — | — | — | — | 0.50 | 0.50 | 0.63 | 0.63 |
| $C_1/C_2$ | — | — | — | — | — | — | — | — | — | — | — | 1.00 | 1.00 | 1.00 | 1.00 |
| $AN_1$ (mgKOH/g) | 55 | 55 | 55 | 55 | 55 | 55 | 55 | 55 | 55 | 55 | 55 | 55 | 55 | 55 | 55 |
| $AN_2$ (mgKOH/g) | — | — | — | — | — | — | — | — | — | — | — | 55 | 55 | 56 | 55 |

TABLE 3-continued

Formulation and properties of inks

Comparative Example

| | 31 | 32 | 33 | 34 | 35 | 36 | 37 | 38 | 39 | 40 | 41 | 42 | 43 | 44 |
|---|---|---|---|---|---|---|---|---|---|---|---|---|---|---|
| Pigment dispersion liquid number | 1 | 1 | 1 + 27 | 1 | 1 + 27 | 1 | 1 | 1 | 1 | 1 | 1 | 1 | 1 | 1 |
| First urethane resin number | 10 | 40 | 41 | 42 | — | — | — | — | 1 | — | — | — | — | — |
| Second urethane resin number | 36 | 34 | 35 | 36 | — | — | — | — | 1 | — | — | — | — | 2 |
| Pigment dispersion liquid | 20.00 | 20.00 | 1.60 + 18.40 | 20.00 | 20.00 | 20.00 | 20.00 | 20.00 | 20.00 | 20.00 | 20.00 | 20.00 | 20.00 | 20.00 |
| Aqueous solution of first urethane resin | 4.00 | 4.00 | 4.00 | 4.00 | 0.20 | 1.00 | 2.00 | 8.00 | 20.00 | 0.20 | 1.00 | 2.00 | 8.00 | 20.00 |
| Aqueous solution of second urethane resin | 4.00 | 4.00 | 4.00 | 4.00 | — | — | — | — | 20.00 | — | — | — | — | 20.00 |
| Aqueous solution of acrylic resin | — | — | — | — | — | — | — | — | — | — | — | — | — | — |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 53.30 | 53.30 | 53.30 | 61.10 | 60.30 | 59.30 | 53.30 | 41.30 | 61.10 | 60.30 | 59.30 | 53.30 | 41.30 |
| Pigment type | QA | QA | QA | QA | QA | QA | QA | QA | QA | QA | QA | QA | QA | QA |
| Zr content (ppm) | 5.0 | 5.0 | 5.0 | 5.0 | 5.0 | 5.0 | 5.0 | 5.0 | 5.0 | 5.0 | 5.0 | 5.0 | 5.0 | 5.0 |
| $C_1$ (%) | 0.40 | 0.40 | 0.40 | 0.40 | 0.02 | 0.10 | 0.20 | 0.80 | 2.00 | 0.00 | 0.00 | 0.00 | 0.00 | 0.00 |
| $C_2$ (%) | 0.40 | 0.40 | 0.40 | 0.40 | 0.00 | 0.00 | 0.00 | 0.00 | 0.00 | 0.02 | 0.10 | 0.20 | 0.80 | 2.00 |
| $Mw_1$ | 19,000 | 15,000 | 15,000 | 15,000 | 15,000 | 15,000 | 15,000 | 15,000 | 15,000 | — | — | — | — | — |
| $Mw_2$ | 30,000 | 30,000 | 30,000 | 30,000 | — | — | — | — | — | 30,000 | 30,000 | 30,000 | 30,000 | 30,000 |
| Polyol of first urethane | PTMG | PCD | PEA | PBA | PPG | PPG | PPG | PPG | PPG | — | — | — | — | — |
| Polyol of second urethane | PBA | PCD | PEA | PBA | — | — | — | — | — | PTMG | PTMG | PTMG | PTMG | PTMG |
| $Mw_1/Mw_2$ | 0.63 | — | — | — | — | — | — | — | — | — | — | — | — | — |
| $C_1/C_2$ | 1.00 | 1.00 | 1.00 | 1.00 | — | — | — | — | — | — | — | — | — | — |
| $AN_1$ (mgKOH/g) | 55 | 55 | 55 | 53 | 55 | 55 | 55 | 55 | 55 | — | — | — | — | — |
| $AN_2$ (mgKOH/g) | 55 | 56 | 55 | 55 | — | — | — | — | — | 55 | 55 | 55 | 55 | 55 |

Reference Example

| | 1 | 2 | 3 | 4 | 5 | 6 | 7 | 8 | 9 | 10 | 11 | 12 |
|---|---|---|---|---|---|---|---|---|---|---|---|---|
| Pigment dispersion liquid number | 27 | 27 | 1 + 27 | 1 + 27 | 21 | 21 | 22 | 22 | 23 | 24 | 25 | 26 |
| First urethane resin number | 1 | — | 1 | — | — | — | 1 | — | — | — | — | — |
| Second urethane resin number | 2 | — | 2 | — | 2 | — | 2 | — | — | — | — | — |
| Pigment dispersion liquid | 20.00 | 20.00 | 1.60 + 18.40 | 1.60 + 18.40 | 20.00 | 20.00 | 20.00 | 20.00 | 20.00 | 20.00 | 20.00 | 20.00 |
| Aqueous solution of first urethane resin | 4.00 | — | 4.00 | — | 4.00 | — | 4.00 | — | — | — | — | — |
| Aqueous solution of second urethane resin | 4.00 | — | 4.00 | — | 4.00 | — | 4.00 | — | — | — | — | — |
| Aqueous solution of acrylic resin | — | — | — | — | — | — | — | — | — | — | — | — |
| Glycerol | 10.00 | 10.00 | 10.00 | 10.00 | 10.00 | 10.00 | 10.00 | 10.00 | 10.00 | 10.00 | 10.00 | 10.00 |
| 1,2-Hexanediol | 5.00 | 5.00 | 5.00 | 5.00 | 5.00 | 5.00 | 5.00 | 5.00 | 5.00 | 5.00 | 5.00 | 5.00 |
| Polyethylene glycol | 3.00 | 3.00 | 3.00 | 3.00 | 3.00 | 3.00 | 3.00 | 3.00 | 3.00 | 3.00 | 3.00 | 3.00 |
| Acetylenol E 100 | 0.50 | 0.50 | 0.50 | 0.50 | 0.50 | 0.50 | 0.50 | 0.50 | 0.50 | 0.50 | 0.50 | 0.50 |
| Proxel GXL (S) | 0.20 | 0.20 | 0.20 | 0.20 | 0.20 | 0.20 | 0.20 | 0.20 | 0.20 | 0.20 | 0.20 | 0.20 |
| Ion-exchanged water | 53.30 | 61.30 | 53.30 | 61.30 | 53.30 | 61.30 | 53.30 | 61.30 | 61.30 | 61.30 | 61.30 | 61.30 |
| Pigment type | QA | QA | QA | QA | CB | CB | AZ | AZ | AZ | AZ | AZ | QX |

TABLE 3-continued

| | Formulation and properties of inks | | | | | | | | | | | |
|---|---|---|---|---|---|---|---|---|---|---|---|---|
| Zr content (ppm) | 0.0 | 0.0 | 0.4 | 0.4 | 22.0 | 22.0 | 2.0 | 2.0 | 6.4 | 3.8 | 5.8 | 4.4 |
| $C_1$ (%) | 0.40 | 0.00 | 0.40 | 0.00 | 0.40 | 0.00 | 0.40 | 0.00 | 0.00 | 0.00 | 0.00 | 0.00 |
| $C_2$ (%) | 0.40 | 0.00 | 0.40 | 0.00 | 0.40 | 0.00 | 0.40 | 0.00 | 0.00 | 0.00 | 0.00 | 0.00 |
| $Mw_1$ | 15,000 | — | 15,000 | — | 15,000 | — | 15,000 | — | — | — | — | — |
| $Mw_2$ | 30,000 | — | 30,000 | — | 30,000 | — | 30,000 | — | — | — | — | — |
| Polyol of first urethane | PPG | — | PPG | — | PPG | — | PPG | — | — | — | — | — |
| Polyol of second urethane | PTMG | — | PTMG | — | PTMG | — | PTMG | — | — | — | — | — |
| $Mw_1/Mw_2$ | 0.50 | — | 0.50 | — | 0.50 | — | 0.50 | — | — | — | — | — |
| $C_1/C_2$ | 1.00 | — | 1.00 | — | 1.00 | — | 1.00 | — | — | — | — | — |
| $AN_1$ (mgKOH/g) | 55 | — | 55 | — | 55 | — | 55 | — | — | — | — | — |
| $AN_2$ (mgKOH/g) | 55 | — | 55 | — | 55 | — | 55 | — | — | — | — | — |

Evaluation

An ink jet recording apparatus equipped with a recording head to eject inks by thermal energy (trade name "PIXUS PRO-10", manufactured by Canon) was used to perform the following evaluations. In the ink jet recording apparatus, an image recorded under conditions where eight ink droplets each having a weight of 3.8 ng are applied to a unit area of 1/600 inch×1/600 inch at a resolution of 600 dpi×600 dpi is defined as a recording duty of 100%. In the present invention, a sample evaluated as "A" or "B" was regarded as an acceptable level, and a sample evaluated as "C" was regarded as an unacceptable level based on the following criteria of each item. The evaluation results are shown in Table 4.

Ejection Property

An ink was filled in an ink cartridge, and the ink cartridge was set in the ink jet recording apparatus. Under the condition where only some of the nozzles of the recording head were used, 200 solid images each having an area of 20 cm×30 cm were recorded at a recording duty of 100%. Then, in order to normally eject the ink from each nozzle of the recording head, a printer driver was used to perform a single cleaning operation of the recording head. Next, a solid image having an area of 5 cm×5 cm was recorded at a recording duty of 60% on a recording medium (trade name "Canon Photo Paper, Plus Glossy", manufactured by Canon). The recorded solid image was put on a wall and visually observed from the distance of 30 cm and 100 cm, and the ejection property was evaluated based on the following criteria.

A: No nonuniformity was observed both from 30 cm and 100 cm.
B: Nonuniformity was observed from 30 cm but no nonuniformity was observed from 100 cm.
C: Nonuniformity was observed both from 30 cm and 100 cm.

Glossiness

An ink was filed in an ink cartridge, and the ink cartridge was set in the ink jet recording apparatus. A pattern including four solid images (5 cm×5 cm) at recording duties of 30%, 60%, 90%, and 120% was recorded on a recording medium (trade name "Canon Photo Paper, Glossy Professional [Platinum Grade]", manufactured by Canon), giving a recorded product. The recorded product was allowed to stand at room temperature for a day to be dried. A microhaze meter (manufactured by BYK Gardner) was then used to measure 20° gloss values of the four solid images, and the average thereof was calculated. From the average and the minimum value of 20° gloss, the glossiness of images was evaluated based on the following criteria.

AA: The average value of the 20° gloss was 50 or more, and the minimum value thereof was 40 or more.
A: The average value of the 20° gloss was 50 or more, and the minimum value thereof was less than 40.
B: The average value of the 20° gloss was not less than 40 and less than 50.
C: The average value of the 20° gloss was less than 40.

TABLE 4

| | | Evaluation results | |
|---|---|---|---|
| | | Ejection property | Glossiness |
| Example | 1 | A | AA |
| | 2 | A | AA |
| | 3 | A | AA |
| | 4 | A | AA |
| | 5 | A | AA |
| | 6 | A | AA |
| | 7 | A | B |
| | 8 | B | AA |
| | 9 | B | AA |
| | 10 | B | B |
| | 11 | A | B |
| | 12 | A | B |
| | 13 | B | B |
| | 14 | B | AA |
| | 15 | A | AA |
| | 16 | A | AA |
| | 17 | B | AA |
| | 18 | A | B |
| | 19 | A | AA |
| | 20 | A | AA |
| | 21 | A | B |
| | 22 | B | AA |
| | 23 | B | AA |
| | 24 | A | AA |
| | 25 | A | A |
| | 26 | B | A |
| | 27 | B | A |
| | 28 | A | A |
| | 29 | A | AA |
| | 30 | B | AA |
| | 31 | A | A |
| | 32 | A | AA |
| | 33 | A | AA |
| | 34 | A | AA |
| | 35 | A | AA |
| | 36 | A | AA |
| | 37 | A | AA |
| | 38 | A | AA |
| | 39 | A | AA |
| | 40 | A | AA |
| | 41 | A | AA |
| | 42 | A | AA |
| | 43 | A | AA |
| | 44 | A | AA |
| | 45 | A | AA |
| | 46 | A | AA |
| | 47 | A | AA |
| | 48 | A | AA |
| | 49 | A | AA |
| | 50 | A | AA |
| | 51 | A | AA |
| | 52 | A | AA |
| | 53 | A | AA |
| | 54 | A | AA |
| | 55 | B | AA |
| | 56 | A | AA |
| | 57 | B | AA |
| | 58 | A | AA |
| | 59 | B | AA |
| | 60 | A | AA |
| | 61 | A | AA |
| | 62 | A | AA |
| | 63 | A | AA |
| | 64 | B | AA |
| | 65 | B | AA |
| | 66 | A | AA |
| | 67 | B | AA |
| | 68 | A | AA |
| | 69 | B | AA |
| | 70 | B | AA |
| | 71 | B | AA |
| | 72 | B | AA |
| | 73 | B | AA |
| | 74 | B | AA |
| | 75 | A | AA |
| | 76 | A | AA |
| | 77 | A | AA |
| | 78 | A | AA |
| | 79 | A | AA |

TABLE 4-continued

Evaluation results

|  |  | Ejection property | Glossiness |
|---|---|---|---|
|  | 80 | A | AA |
|  | 81 | A | AA |
|  | 82 | A | AA |
|  | 83 | A | AA |
|  | 84 | A | AA |
|  | 85 | A | AA |
|  | 86 | A | AA |
|  | 87 | A | AA |
|  | 88 | A | AA |
|  | 89 | A | AA |
|  | 90 | A | AA |
|  | 91 | A | AA |
|  | 92 | A | AA |
|  | 93 | A | AA |
|  | 94 | A | AA |
|  | 95 | A | AA |
|  | 96 | A | AA |
|  | 97 | B | AA |
|  | 98 | B | AA |
|  | 99 | B | AA |
|  | 100 | B | AA |
|  | 101 | B | AA |
|  | 102 | B | AA |
|  | 103 | A | AA |
|  | 104 | A | AA |
|  | 105 | A | AA |
|  | 106 | A | AA |
|  | 107 | A | AA |
|  | 108 | B | AA |
|  | 109 | B | A |
|  | 110 | A | A |
|  | 111 | A | AA |
|  | 112 | A | AA |
|  | 113 | A | AA |
|  | 114 | A | AA |
|  | 115 | B | A |
|  | 116 | A | A |
|  | 117 | A | A |
|  | 118 | A | AA |
|  | 119 | A | AA |
|  | 120 | A | AA |
|  | 121 | B | A |
|  | 122 | A | A |
|  | 123 | A | A |
|  | 124 | A | AA |
|  | 125 | A | AA |
|  | 126 | B | A |
|  | 127 | A | A |
|  | 128 | A | AA |
|  | 129 | B | AA |
|  | 130 | B | A |
|  | 131 | B | AA |
|  | 132 | A | AA |
|  | 133 | A | A |
|  | 134 | A | AA |
|  | 135 | A | AA |
|  | 136 | A | AA |
|  | 137 | A | A |
|  | 138 | A | AA |
|  | 139 | A | AA |
|  | 140 | A | AA |
|  | 141 | A | A |
|  | 142 | A | AA |
|  | 143 | A | AA |
|  | 144 | A | B |
|  | 145 | A | B |
|  | 146 | A | B |
|  | 147 | A | B |
|  | 148 | A | AA |
|  | 149 | A | A |
|  | 150 | A | AA |
|  | 151 | A | AA |
|  | 152 | A | AA |
|  | 153 | A | AA |
|  | 154 | A | A |
|  | 155 | A | AA |
|  | 156 | A | AA |
|  | 157 | A | AA |
|  | 158 | A | AA |
|  | 159 | A | A |
|  | 160 | A | AA |
|  | 161 | A | AA |
|  | 162 | A | AA |
|  | 163 | A | AA |
|  | 164 | A | A |
|  | 165 | A | AA |
|  | 166 | A | AA |
|  | 167 | A | B |
|  | 168 | A | B |
|  | 169 | A | B |
|  | 170 | A | B |
|  | 171 | A | B |
|  | 172 | A | AA |
|  | 173 | A | AA |
|  | 174 | A | AA |
|  | 175 | A | AA |
|  | 176 | A | AA |
|  | 177 | A | AA |
|  | 178 | A | AA |
|  | 179 | A | AA |
|  | 180 | A | AA |
|  | 181 | A | AA |
| Comparative | 1 | C | AA |
| Example | 2 | C | B |
|  | 3 | C | B |
|  | 4 | C | AA |
|  | 5 | C | B |
|  | 6 | C | B |
|  | 7 | C | AA |
|  | 8 | C | AA |
|  | 9 | C | C |
|  | 10 | C | C |
|  | 11 | C | B |
|  | 12 | C | B |
|  | 13 | C | B |
|  | 14 | C | B |
|  | 15 | C | B |
|  | 16 | C | B |
|  | 17 | C | B |
|  | 18 | C | B |
|  | 19 | C | B |
|  | 20 | C | B |
|  | 21 | C | B |
|  | 22 | C | B |
|  | 23 | C | B |
|  | 24 | C | B |
|  | 25 | C | B |
|  | 26 | C | B |
|  | 27 | C | AA |
|  | 28 | C | AA |
|  | 29 | C | AA |
|  | 30 | C | AA |
|  | 31 | C | AA |
|  | 32 | C | AA |
|  | 33 | C | AA |
|  | 34 | C | AA |
|  | 35 | C | B |
|  | 36 | C | B |
|  | 37 | C | B |
|  | 38 | C | B |
|  | 39 | C | B |
|  | 40 | C | B |
|  | 41 | C | B |
|  | 42 | C | B |
|  | 43 | C | B |
|  | 44 | C | B |
| Reference | 1 | A | AA |
| Example | 2 | A | C |
|  | 3 | A | AA |
|  | 4 | A | C |
|  | 5 | A | AA |
|  | 6 | A | AA |

TABLE 4-continued

| | Evaluation results | |
|---|---|---|
| | Ejection property | Glossiness |
| 7 | A | AA |
| 8 | A | C |
| 9 | A | C |
| 10 | A | C |
| 11 | A | C |
| 12 | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-156883, filed Aug. 7, 2015, which is hereby incorporated by reference herein in its entirety.

What is claimed is:

1. An aqueous ink for use in an ink jet recording method in which an ink is ejected from a recording head by action of thermal energy to record an image on a recording medium, the aqueous ink comprising:
    (a) zirconium oxide;
    (b) a pigment;
    (c) a resin dispersant for dispersing the pigment;
    (d) a first urethane resin; and
    (e) a second urethane resin,
    wherein a content (ppm) of the zirconium oxide in terms of zirconium is 0.5 ppm or more to 20.0 ppm or less based on the total mass of the ink,
    wherein the pigment comprises at least one pigment selected from the group consisting of phthalocyanine pigments, quinacridone pigments, diketopyrrolopyrrole pigments, dioxazine pigments, perinone pigments, perylene pigments, and anthraquinone pigments,
    wherein each of the first urethane resin and the second urethane resin has a unit derived from a polyether polyol,
    wherein a ratio of a weight-average molecular weight $Mw_1$ of the first urethane resin to a weight-average molecular weight $Mw_2$ of the second urethane resin is 0.20 times or more to 0.80 times or less, and
    wherein the second urethane resin has a weight-average molecular weight $Mw_2$ of 20,000 or more to 70,000 or less.

2. The aqueous ink according to claim 1, wherein the first urethane resin has a weight-average molecular weight $Mw_1$ of 5,000 or more to 30,000 or less.

3. The aqueous ink according to claim 2, wherein the second urethane resin has a weight-average molecular weight $Mw_2$ of 25,000 or more to 60,000 or less.

4. The aqueous ink according to claim 1, wherein the first urethane resin has a weight-average molecular weight $Mw_1$ of 10,000 or more to 20,000 or less.

5. The aqueous ink according to claim 1, wherein one of the first urethane resin and the second urethane resin has a unit derived from polypropylene glycol, and the other has a unit derived from at least one of polypropylene glycol and polytetramethylene glycol.

6. The aqueous ink according to claim 1, wherein a content (% by mass) of the second urethane resin is 0.02% by mass or more to 2.00% by mass or less based on the total mass of the ink.

7. The aqueous ink according to claim 1, wherein a content (% by mass) of the first urethane resin is 0.02% by mass or more to 2.00% by mass or less based on the total mass of the ink.

8. The aqueous ink according to claim 1, wherein a mass ratio of a content (% by mass) of the first urethane resin to a content (% by mass) of the second urethane resin is 0.50 times or more.

9. An ink cartridge comprising an ink and an ink storage portion for storing the ink,
    wherein the ink comprises the aqueous ink according to claim 1.

10. An ink jet recording method comprising ejecting an ink from a recording head by action of thermal energy to record an image on a recording medium, wherein the ink comprises the aqueous ink according to claim 1.

11. The aqueous ink according to claim 1, wherein the resin dispersant comprises a (meth)acrylic resin.

12. The aqueous ink according to claim 1, wherein the content (% by mass) of the pigment in the ink is 0.20% by mass or more to 10.00% by mass or less based on the total mass of the ink.

13. The aqueous ink according to claim 1, wherein the first urethane resin has an acid value of 30 mg KOH/g or more to 100 mg KOH/g or less, and the second urethane resin has an acid value of 30 mg KOH/g or more to 100 mg KOH/g or less.

14. The aqueous ink according to claim 8, wherein the mass ratio of a content (% by mass) of the first urethane resin to a content (% by mass) of the second urethane resin is 200.00 times or less.

15. The aqueous ink according to claim 8, wherein the mass ratio of a content (% by mass) of the first urethane resin to a content (% by mass) of the second urethane resin is 100.00 times or less.

* * * * *